(12) United States Patent
Sun et al.

(10) Patent No.: US 10,566,793 B2
(45) Date of Patent: Feb. 18, 2020

(54) SYSTEMS AND METHODS FOR DISTRIBUTED SYNCHRONIZATION OF MICRO-GRIDS WITH MULTIPLE POINTS OF INTERCONNECTION

(71) Applicant: Mitsubishi Electric Research Laboratories, Inc., Cambridge, MA (US)

(72) Inventors: Hongbo Sun, Lexington, MA (US); Shahil Shah, Troy, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 70 days.

(21) Appl. No.: 15/719,760

(22) Filed: Sep. 29, 2017

(65) Prior Publication Data
US 2019/0103743 A1    Apr. 4, 2019

(51) Int. Cl.
*H02J 3/08* (2006.01)
*G05B 19/042* (2006.01)
(Continued)

(52) U.S. Cl.
CPC .............. *H02J 3/08* (2013.01); *G05B 19/042* (2013.01); *H02J 3/18* (2013.01); *H02J 3/381* (2013.01); *G05B 2219/2639* (2013.01)

(58) Field of Classification Search
CPC .............. H02J 3/08; H02J 3/18; G05B 19/042
See application file for complete search history.

(56) References Cited

U.S. PATENT DOCUMENTS 7,122,916 B2   10/2006 Nguyen et al.
9,720,395 B2    8/2017 Shi
(Continued)

FOREIGN PATENT DOCUMENTS

CN      106026188 A      10/2016

OTHER PUBLICATIONS

Di Shi et al., "A Distributed Cooperative Control Framework for Synchronized Reconnection of a Multi-Bus Microgrid," IEEE, Transactions on Smart Grid, Jun. 22, 2017.

*Primary Examiner* — Thomas C Lee
*Assistant Examiner* — Charles Cai
(74) *Attorney, Agent, or Firm* — Gennadiy Vinokur; James McAleenan; Hironori Tsukamoto

(57) ABSTRACT

A distributed synchronization method for interconnecting a microgrid with adjacent power grids at multiple points of interconnections. Receiving a request to connect to the microgrid from a first identified adjacent power grid. Synchronization controllers for each generator of the microgrid identify the generator connecting to the point of common coupling between the microgrid and the first adjacent power grid, and assigns the generator as a leader generator. Determining a frequency synchronization correction and a voltage synchronization correction by the synchronization controller of the leader generator, from synchronization parameters received from the first adjacent power grid. Adjusting active and reactive outputs of the follower generators and the leader generator and connecting the first adjacent power grid with the microgrid when a set of predetermined thresholds are satisfied. Reassigning the leader generator as a follower generator after connecting the first adjacent power grid with the microgrid to iterating synchronize each remaining identified adjacent power grid.

20 Claims, 23 Drawing Sheets

(51) Int. Cl.
*H02J 3/18* (2006.01)
*H02J 3/38* (2006.01)

(56) References Cited

U.S. PATENT DOCUMENTS

| | | | |
|---|---|---|---|
| 2015/0295581 A1* | 10/2015 | Shi | H02J 3/40 |
| | | | 700/287 |
| 2015/0311716 A1* | 10/2015 | He | H02J 3/16 |
| | | | 700/287 |
| 2016/0126734 A1* | 5/2016 | Price | H02J 3/008 |
| | | | 700/291 |
| 2016/0266559 A1* | 9/2016 | Shi | G05B 19/042 |
| 2016/0285268 A1* | 9/2016 | Majumder | H02J 3/38 |
| 2017/0005473 A1* | 1/2017 | Somani | H02J 3/381 |
| 2017/0271882 A1* | 9/2017 | Ravikumar | H02J 3/46 |
| 2018/0054055 A1* | 2/2018 | Majumder | H02J 3/38 |
| 2018/0076630 A1* | 3/2018 | Ren | H02M 7/493 |

* cited by examiner

Step 110) Synchronization controller processor of a microgrid generator at the point of common coupling of a first adjacent power grid receive interconnection request from the adjacent power grid and sets the generator as a leader generator

Step 120) Synchronization controller processor of the leader generator determines the synchronization parameters of the first adjacent power grid based on measurements obtained from the side of the point of common coupling to the adjacent grid

Step 130) Synchronization controller of the leader generator determines frequency and voltage corrections for synchronization, and achieve consensus on frequency and voltage synchronization corrections with follower generators through neighboring communication between generators

Step 140) Synchronization controllers of leader and follower generators trigger the primary and secondary controllers to adjust active and reactive outputs of generators based on droop laws according to frequency and voltage references modified with the frequency and voltage corrections for synchronization

Step 150) Synchronization controller of the leader generator verifies when the synchronization parameter mismatches between two sides of the said point of common coupling are less than a predetermined threshold, interconnects the microgrid with the first adjacent grid, and resets the leader generator as a follower generator.

FIG. 1A

SYSTEMS AND METHODS FOR DISTRIBUTED SYNCHRONIZATION OF MICRO-GRIDS WITH MULTIPLE POINTS OF INTERCONNECTION

FIELD

The present disclosure relates generally to controlling of electric power systems, and more particularly to distributed synchronization of microgrids with multiple points of interconnection.

BACKGROUND

Electric power systems have multiple generation units that operate in synchronism under a normal operation. That is, frequency, phase, and amplitude of voltages at the terminals of a generator hold a fixed relationship with the same parameters of the remaining generators in the power system. Before a generator can be connected to an electric power system, the frequency, phase, and amplitude of the voltages at its bus need to be matched with those of the power system at the point of interconnection. Once, the so called synchronization parameters are matched within a desired tolerance, the generator breaker is closed. Any mismatch in the synchronization parameters during connection of a generation unit by a generator breaker may result in undesired transients and disruption of the system.

The concept of microgrid, in which several small distributed generation units operate together to form a small power system, is finding increasing acceptance as a solution to increase the share of renewable energy resources. A microgrid may be operated in either of the following two modes: grid-connected mode and islanded mode. In grid-connected model, entire microgrid constituting several distributed generation units operate as a single generator from the perspective of the main grid. Hence, synchronization of a microgrid with the main grid is further challenging as the synchronization parameters of the microgrid at the point of interconnection with the main grid depends on several generation units. Synchronization process may also require communication among the distributed generation units in the microgrid.

U.S. Pat. No. 7,122,916 B2 discloses a multi-unit power generation system comprising a plurality of generators connected in parallel, a switching system for switching between and/or aggregating a generator load produced by the plurality of generators and a utility grid load, and a control system. The control system is in communication with each generator for communicating command signals to each generator. The control system is further in communication with the switching system for commanding the switching system to switch between or aggregate the generator load and the utility grid load. Each generator may comprise, for example, a microturbine generator.

SUMMARY

The present disclosure relates to controlling of electric power systems, and more particularly to distributed synchronization of microgrids with multiple points of interconnection.

The embodiments of the present disclosure are based on interconnecting an isolated microgrid with adjacent power grids at multiple points of interconnections, i.e. multiple points of common coupling. In particular, a physical layer for the microgrid is an electrical network that includes a set of buses connected with transmission lines, and a set of controllable distributed generators, non-controllable distributed generators and loads. The communication layer is a communication network that provides communication links between the local controllers for controllable distributed generators for information exchange, which provides for synchronization that can be achieved iteratively.

The present disclosure addresses, among other things, connecting micro-grids quickly and reliably with each other, or to a main power grid, whenever demanded by an independent system operator or a transmission system operator. In particular, regarding the present disclosure, at least one challenge to overcome included being able to connect the microgrid to a power system without being restricted to having to match the frequency, phase, and amplitude of the voltages at a fixed point of interconnection with those of the entire power system. Especially, since a microgrid can cover a large geographical area, the microgrid can have multiple points of interconnection to connect with a main power grid or other adjacent microgrids. In other words, this meant that the frequency, phase and voltage matching between the microgrid and the power system should be able to be implemented at multiple interconnection points through effectively controlling the distributed generators located in the microgrid, i.e. which is a restriction we wanted to overcome.

At least one realization of the present disclosure is providing a synchronization controller for each distributed generator of the microgrid. Such that upon receiving a request to connect to the microgrid from a first identified adjacent power grid. The synchronization controllers of the microgrid can then identify the distributed generator connecting to the point of interconnection between the microgrid and the first adjacent power grid. Which is followed by assigning the identified distributed generator as a leader distributed generator, and all remaining distributed generators are assigned as follower distributed generators within the microgrid. In doing so, provides for achieving synchronization in a distributed manner with a sparse communication network and offers sufficient flexibility for achieving synchronization at multiple interconnection points without complicated communication requirements.

Specifically, the present disclosure reconfigures the communication network to disable the local controller of leader generator receiving information from neighboring generators, and enable the information states for the leader generators updating only based on the receiving synchronization parameters measured at the point of interconnection information, such that the synchronization parameters can include a voltage frequency, a voltage phase angle, and a voltage magnitude.

Based upon our initial realization, we further realized that the synchronization controller of the leader distributed generator can determine a frequency synchronization correction and a voltage synchronization correction, based on synchronization parameters measured at the point of interconnection from the first adjacent power grid. Specifically, the present disclosure can then set a frequency synchronization correction and a voltage synchronization correction for the leader generator according the synchronization parameters at the side of the point of interconnection to the first adjacent power grid. The consensus of frequency and voltage synchronization corrections for leader and are then achieved through neighboring communications among leader and follower generators. Considered that the phase angle can be determined as an integral of frequency, the phase synchronization is embedded into frequency synchronization to be achieved by setting frequency correction using following strategy: when the frequency difference between the microgrid and the first adjacent power grid is larger than a predetermined threshold, the frequency at the adjacent grid is used directly to set the frequency correction; however, if the frequency difference is less than the threshold, the variation rate of phase at the first adjacent power grid is used to set the frequency synchronization correction.

After that, the active and reactive outputs of the leader generator and follower generators can be adjusted by modifying frequency and voltage references of controllers with the frequency synchronization correction and voltage synchronization correction determined for leader generator. Since the frequency and voltage of the microgrid is depended on the active and reactive power balances of the microgrid, adjusting the active and reactive power outs of distributed generators can result in power balance changes, and therefore enable achieving the desired changes of the frequency and voltage for the microgrid. The breaker or switch is closed between the microgrid and the adjacent power grid to be connected when the difference of synchronization parameters between the sides of the point of interconnection are less than predetermined thresholds.

The next step can include connecting the first adjacent power grid with the microgrid, based on when a set of predetermined synchronization parameter mismatch thresholds are satisfied. Each type of synchronization parameter, including phase, frequency and voltage has its own mismatch threshold respectively. The condition is met when the actual mismatches of synchronization parameters between the microgrid and the first adjacent power grids are less than the predetermined thresholds. To avoid causing equipment damage or safety issues, the switch should not be closed until the condition is met. The next step includes reconfiguring the communication network to enable bi-way communication of the leader generator and reassigning the leader generator as a follower generator to follow the droop and consensus laws of follower generators after the switch between the microgrid and the adjacent power grid is closed. Since there are no differences for synchronization parameters at both sides of the point of interconnection after the switch is closed, the synchronization corrections for the current leader generator would be always zero, if its communication links were not reconfigured to enable bi-way communication with neighboring generators. Reassigning the leader generator as a follower generator enables the generator participating in the synchronization at other different point of interconnection. Further, the present disclosure can then, executed iteratively the above steps until no further interconnections are required.

At least some advantages of the present disclosure distributed synchronization systems and methods include retaining the advantages of the distributed control, such as requiring only a sparse communication network among the generators and avoiding central coordination, and at the same time it adds synchronization ability at multiple points of interconnection. Unlike conventional centralized based synchronization methods, the present disclosure systems and methods do not require separate communication system for each of the interconnection points. This functionality of the present disclosure is critical for the networked operation of multiple micro-grids in the future power systems. The present disclosure systems and methods are also different than the existing conventional distributed based synchronization methods that use a fixed leader node, wherein the present disclosure provides for communication network to have multiple leaders, and therefore synchronization can be achieved at multiple points of interconnection.

The present disclosures synchronization systems and methods achieve a smooth transition between the synchronized (grid-connected or islanded) mode and synchronization mode using two control modes, averaging mode and leader-follower mode that are two commonly used consensus control methods. The systems and methods of the present disclosure have a naturally smooth transition from synchronization to synchronized mode, due to the interplay between the proposed leader-follower mode and the averaging mode. On the other hand, smooth transition from synchronized mode to synchronization mode may be achieved by putting a low-pass filter before using the synchronization correction information states in the generator controls. The smooth transitions between microgrid modes are important for maintaining the stable operation of the microgrid. For example, if a synchronization function activation or deactivation at the leader node is implemented by using a mode selection switch, the change in mode abruptly adds/removes corrections to the frequency and voltage reference to the leader's voltage, and therefore such abrupt change in the voltage and frequency of one generator might lead to large active and reactive power mismatch, or even loss of synchronism.

The communication network can also be reconfigured according to the progress of synchronization. When the synchronization is triggered, the communication network is configured as a rooted directed spanning tree by taking the leader generator node as the root, and disabling all communication links to receive information from neighboring generators. Meanwhile, when the synchronization is done or microgrid is at synchronized mode, the communication network is configured as a connected undirected graph to enable all controllable generators having bi-way communications for exchanging information with neighbors.

The present disclosure achieves distributed synchronization by adding two information states, including frequency synchronization correction and voltage synchronization correction to modify the frequency and voltage references of the distributed primary and secondary control of generators. These added information states are updated using consensus laws that are separate from the secondary control consensus laws if distributed secondary controls are used. Hence, it avoids causing disturbances to the inherent primary droop control and secondary droop control functionalities of the microgrid, but instead builds upon it as an additional layer. It is noted that the present disclosure focuses on synchronization without assuming specific objective for the secondary control. Hence, secondary control objective can be independently defined from the invented synchronization control. For example, a compromise between exact voltage control and exact reactive power sharing can be implemented in the secondary control, without worrying about how it will affect the synchronization control. In comparison, if integrated the synchronization into the distributed secondary control laws directly, due to the interaction of frequency control and active power sharing, and conflict between reactive power sharing and voltage control (cause by the voltage drop across transmission lines), adding synchronization functions to the same loop may lead to additional stability issues. Besides integrated synchronization with secondary control, if integrated local droop control into the distributed secondary control as well, the situation can be even worse. Essentially by doing so, the active and reactive power sharing functions are transferred to the secondary control. However, primary droop control in microgrids performs an important function of maintaining power sharing in the event of load or any other transient before the secondary control can react. By removing the primary droop control and transferring that functionality to the secondary control, the microgrid is vulnerable to large power mismatches during transients as the secondary control is slow, particularly due to the communication speeds, and its reaction time is limited.

According to an embodiment of the disclosure, a distributed synchronization method for interconnecting a microgrid with adjacent power grids at multiple points of interconnections. Wherein each distributed generator of the microgrid includes synchronization controller. The method includes the steps of receiving a request to connect to the microgrid from a first identified adjacent power grid in time. Wherein the synchronization controllers of the microgrid identifies the distributed generator connecting to the point of interconnection between the microgrid and the first adjacent power grid, and assigns as a leader distributed generator, and all remaining distributed generators are assigned as follower distributed generators within the micro grid. The step of determining a frequency synchronization correction and a voltage synchronization correction by the synchronization controller of the leader distributed generator, based on synchronization parameters received from the first adjacent power grid. The step of adjusting active and reactive outputs of the follower distributed generators and the leader distributed generator, by modifying frequency and voltage references for each distributed generator in the microgrid with the determined frequency synchronization correction and voltage synchronization correction. The step of connecting the first adjacent power grid with the microgrid based on when a set of predetermined synchronization parameters thresholds are satisfied. The step of reassigning the leader distributed generator as a follower distributed generator after connecting the first adjacent power grid with the microgrid. The step of iterating synchronizing of each remaining identified adjacent power grid with the above steps, based on a received request to connect to the microgrid from an identified adjacent power grid.

According to another embodiment of the disclosure, a distributed synchronization method for interconnecting a microgrid with adjacent electric power grids at multiple points of interconnections. Wherein each distributed generator of the microgrid includes a primary controller, a secondary controller and a synchronization controller. The method includes the steps of receiving a request to connect to the microgrid from a first identified adjacent power grid in time. Wherein the synchronization controllers of the microgrid identifies the distributed generator connecting to the point of interconnection between the microgrid and the first adjacent power grid, and assigns as a leader distributed generator, and all remaining distributed generators are assigned as follower distributed generators within the micro grid. Wherein the leader distributed generator only accepts information from the first identified adjacent power grid; The step of determining a frequency synchronization correction and a voltage synchronization correction by the synchronization controller of the leader distributed generator, based on synchronization parameters received from the first adjacent power grid. The step of adjusting active and reactive outputs of the follower distributed generators and the leader distributed generator, by modifying frequency and voltage references for each distributed generator in the microgrid with the determined frequency synchronization correction and voltage synchronization correction. The step of connecting the first adjacent power grid with the microgrid based on when a set of predetermined synchronization parameters thresholds are satisfied. Wherein the set of the first predetermined synchronization parameters thresholds are received from a user of a user input interface in communication with the synchronization controllers of the microgrid. The step of reassigning the leader distributed generator as a follower distributed generator after connecting the first adjacent power grid with the microgrid. The step of iterating synchronizing of each remaining identified adjacent power grid with the above steps, based on a received request to connect to the microgrid from an identified adjacent power grid.

According to another embodiment of the disclosure, a distributed synchronization system for interconnecting a microgrid with adjacent power grids at multiple points of interconnections. The system including a primary controller, a secondary controller and a synchronization controller for each distributed generator of the microgrid. A user input interface, such that a user of the user input interface is in communication with the synchronization controllers of the microgrid, and provides a set of first predetermined synchronization parameter thresholds. A first identified adjacent power grid sends a request to connect to the microgrid which is received according in time. Wherein the synchronization controllers of the microgrid identifies the distributed generator connecting to the point of interconnection between the microgrid and the first adjacent power grid, and assigns as a leader distributed generator, and all remaining distributed generators are assigned as follower distributed generators within the microgrid. Wherein the synchronization controller of the leader distributed generator is configured to determine a frequency synchronization correction and a voltage synchronization correction, based on synchronization parameters received from the first adjacent power grid, and achieving consensus on frequency and voltage corrections for synchronization among all generators of the microgrid. Adjust active and reactive outputs of the follower distributed generators and the leader distributed generator, by modifying frequency and voltage references for each distributed generator in the microgrid with the determined frequency synchronization correction and voltage synchronization correction. Connect the first adjacent power grid with the microgrid based on when the set of first predetermined synchronization parameter thresholds are satisfied. Reassigns the leader distributed generator as a follower distributed generator after connecting the first adjacent power grid with the microgrid. Iterate synchronizing of each remaining identified adjacent power grid with the above steps, based on a received request to connect to the microgrid from an identified adjacent power grid.

Further features and advantages of the present disclosure will become more readily apparent from the following detailed description when taken in conjunction with the accompanying Drawing.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

FIG. 1A is a schematic block diagram of some steps of a distributed synchronization method for interconnecting a microgrid with adjacent power grids at multiple points of interconnections, according to some embodiments of the present disclosure;

Figure 1B:
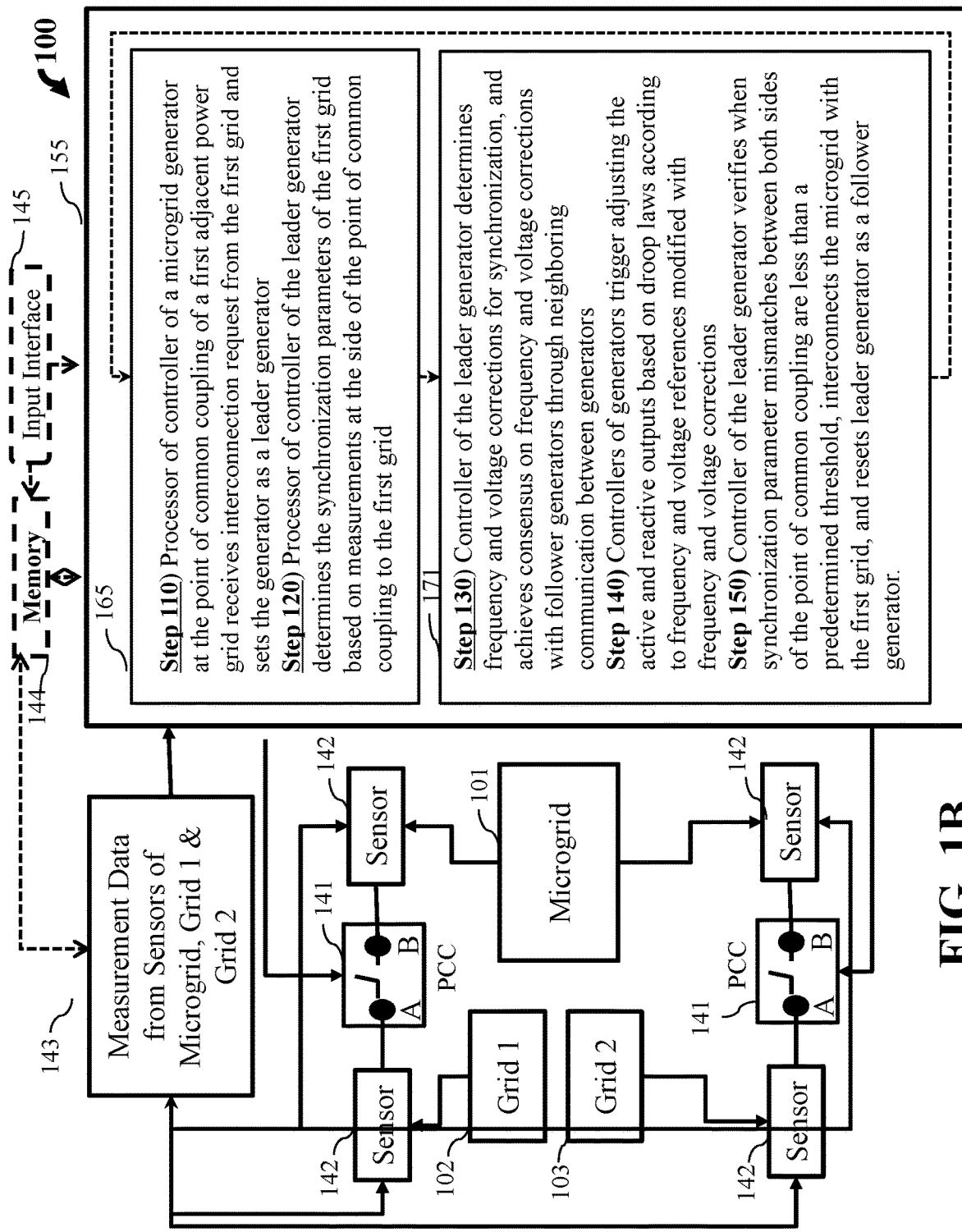
FIG. 1B is a schematic illustrating steps of the distributed synchronization method along with some components of the system, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

The present disclosure relates to controlling of electric power systems, and more particularly to distributed synchronization of microgrids with multiple points of interconnection.

The embodiments of the present disclosure are based on interconnecting an isolated microgrid with adjacent power grids at multiple points of interconnections. In particular, a physical layer for the microgrid is an electrical network that includes a set of buses connected with transmission lines, and a set of controllable distributed generators, non-controllable distributed generators and loads. The communication layer is a communication network that provides communication links between the local controllers for controllable distributed generators for information exchange, which provides for synchronization that can be achieved iteratively.

At least one realization of the present disclosure is providing a synchronization controller for each distributed generator of the microgrid. Such that upon receiving a request to connect to the microgrid from a first identified adjacent power grid. The synchronization controllers of the microgrid can then identify the distributed generator connecting to the point of interconnection between the microgrid and the first adjacent power grid. Which is followed by assigning the identified distributed generator as a leader distributed generator, and all remaining distributed generators are assigned as follower distributed generators within the microgrid. In doing so, provides for achieving synchronization in a distributed manner with a sparse communication network and offers sufficient flexibility for achieving synchronization at multiple interconnection points without complicated communication requirements.

Specifically, the present disclosure reconfigures the communication network to disable the local controller of leader generator receiving information from neighboring generators, and enables the information states for the leader generator updating only based on the receiving synchronization parameters measured at the point of interconnection information, such that the synchronization parameters can include a voltage frequency, a voltage phase angle, and a voltage magnitude.

Based upon our initial realization, we further realized that the synchronization controller of the leader distributed generator can determine a frequency synchronization correction and a voltage synchronization correction, based on synchronization parameters received from the first adjacent power grid. Specifically, the present disclosure can then set a frequency synchronization correction and a voltage synchronization correction for the leader generator according the synchronization parameters at the point of interconnection. Considered that the phase angle can be determined as an integral of frequency, the phase synchronization is embedded into frequency synchronization to be achieved by setting frequency correction using following strategy: when the frequency difference between the microgrid and the first adjacent grid is larger than a predetermined threshold, the frequency at the adjacent grid is used directly to set the corresponding frequency synchronization correction. However, if the frequency difference is less than the threshold, the variation rate of phase at the adjacent grid is used to set the frequency synchronization correction.

After that, the active and reactive outputs of the leader generator and follower generators can be adjusted by modifying frequency and voltage references of controllers with the frequency synchronization correction and voltage synchronization correction determined for leader generator. Since the frequency and voltage of the microgrid is depended on the active and reactive power balances of the microgrid, adjusting the active and reactive power outs of distributed generators can achieve the desired changes of the frequency and voltage for the microgrid. The switch is closed between the microgrid and the adjacent power grid to be connected when the difference of synchronization parameters between both sides of the point of interconnection are less than predetermined thresholds. The next step can include connecting the first adjacent power grid with the microgrid, based on when a set of predetermined thresholds for synchronization parameter mismatches are satisfied. The mismatch thresholds are given for each type of synchronization parameter, including phase, frequency and voltage. The condition is met when the actual mismatches between the microgrid and the first adjacent power grid are less than the predetermined thresholds. The switch should not be closed if the condition is not met, to avoid causing equipment damage or other safety issues.

The next step includes reconfiguring the communication network to enable bi-way communication of the leader generator and setting the leader generator as a follower generator to follow the droop and consensus laws of follower generators after the switch between the microgrid and the adjacent power grid is closed. Since there are no differences for synchronization parameters at both sides of the point of interconnection after the switch is closed, the synchronization corrections for the current leader generator would be always zero, if its communication links were not reconfigured to enable bi-way communication with neighboring generators. Reassigning the leader generator as a follower generator enables the generator participating in the synchronization at other different point of interconnection. Further, the present disclose can then, executed iteratively the above steps until no further interconnections are required.

FIG. 1A is a schematic block diagram of some steps of a distributed synchronization method for interconnecting a microgrid with adjacent power grids at multiple points of interconnections, according to some embodiments of the present disclosure.

The synchronization system 100 having a synchronization controller 155 for each distributed generator and at least one processor for each synchronization controller, wherein a processor 165 provides for steps 110 and 120 and a processor 171 provides for controller steps 130, 140 and 150. The synchronization system iterates executing those steps to enable the microgrid connecting with adjacent power grids timely when there is an operation need for system interconnections.

Step 110 includes the processor of synchronization controller for the distributed generator at the point of common coupling of a first adjacent power grid receives interconnection request from the adjacent power grid and sets the distributed generator as a leader generator.

Step 120 includes the processor of synchronization controller of the leader generator determines the synchronization parameters of the first adjacent power grid based on measurements obtained from the side of the point of common coupling to the first adjacent power grid.

Step 130 includes the synchronization controller of the leader generator determines frequency and voltage corrections for synchronization, and achieve consensus on frequency and voltage synchronization corrections with follower generators through neighboring communication among generators.

Step 140 includes the synchronization controllers trigger the primary and secondary controls of leader and follower generators to adjust active and reactive outputs of generators based on droop laws according to frequency and voltage references modified with the frequency and voltage corrections for synchronization.

Step 150 includes the synchronization controller of the leader generator verifies when the synchronization parameter mismatches between two sides of the said point of common coupling are less than a predetermined threshold, connects the microgrid with the first adjacent grid, and resets the leader generator as a follower generator.

FIG. 1B is a schematic illustrating steps of the distributed synchronization method along with some components of the system, according to some embodiments of the present disclosure.

The synchronization system 100 includes a microgrid 101, a first adjacent power grid 102, and a second or other adjacent power grid 103.

A circuit breaker or switch installed at a point of common coupling A, B, 141 between the microgrid 101 and the first or other adjacent power grid 102, 103. Wherein the breaker or switch in an open position separates the microgrid 101 from the adjacent power grid 102 or 103, and in a close position connects the microgrid 101 with the adjacent power grid 102 or 103.

Still referring to FIG. 1B, the processors 165 of synchronization controllers of generators at the points of common coupling 141 between microgrid 101 and adjacent power grids 102 and 103 continuously monitors if there is an interconnection request received from the adjacent power grids (step 110). If a request is received, the corresponding generator acts as leader generator, and the processor continually determines the synchronization parameters for the identified adjacent grid to be interconnected from the measurements 143 collected from the sensors 142 (step 120).

Still referring to FIG. 1B, the processor 165 determines synchronization parameters for the microgrid 101 and the identified adjacent grid 102, or 103, at sides A, B of point of common coupling 141 (step 120). Wherein a first sensor 142 is located on a side A of the point of the common coupling for continually determining the synchronization parameters of the microgrid 101. A second sensor 142 is located on another side B of the point of the common coupling for continually determining the synchronization parameters of the adjacent power grid 102, or 103. Such that the synchronization parameters for the microgrid 101 and the adjacent power grid 102, or 103 are indicative of at least a frequency, a phase and a voltage.

The controller 155 of the leader generator determines frequency and voltage corrections for synchronization, and achieves consensus on frequency and voltage corrections with follower generators through neighboring communication among generators (step 130). The controller 155 for each generator then triggers adjusting active and reactive outputs based on droop laws according to frequency and voltage references modified with frequency and voltage corrections (step 140). Finally, the controller 155 of the leader generator verifies when synchronization parameter mismatches between both sides of the point of common coupling 141 are less than a predetermined threshold, connects the microgrid with the identified power grid by moving the breaker or switch position from the open position to the close position, and resets leader generator as a follower generator (step 150).

Optionally, the synchronization system 100 can store the continuous measurement data 143 in a computer readable memory 144, wherein the computer readable memory is in communication with the controller 155 and processor 165. Further, it is possible an input interface 145 can be in communication with the memory 144 and the controller 155 and processor 165. For example, a user via a user interface of the input interface 145 may input predetermined conditions, i.e. the predetermined mismatch thresholds.

Figure 1C:
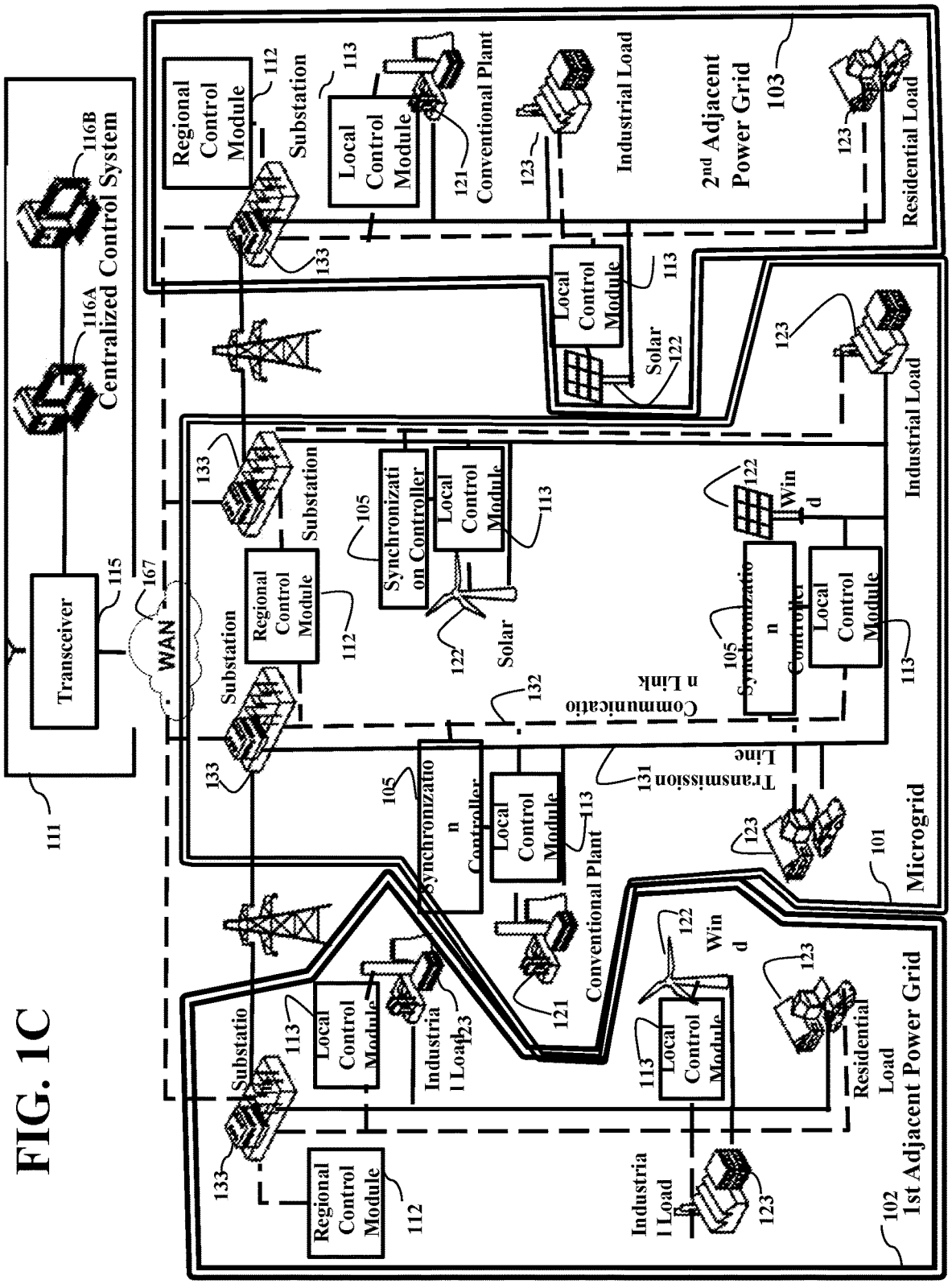
FIG. 1C is a schematic illustrating the distributed synchronization method for interconnecting of a microgrid with adjacent power grids, according to some embodiment of the present disclosure.

FIG. 1C is a schematic illustrating the distributed synchronization method for interconnecting a microgrid, 101 with adjacent power grids, 102 and 103, according to some embodiment of the present disclosure.

The power sources of the exemplar microgrid and adjacent power grids include the conventional power generation facilities 121, and the renewable source of the energy 122, such as wind turbine farms and solar arrays. The power consumers 123 of the exemplar microgrid and adjacent power grids include the industrial/commercial loads representative of industrial plant or large commercial enterprises, and/or the residential loads representative of residential customers. The power plants, 121 and 122 are coupled with the power consumers, 123 through the substations 133 and transmission lines 131. Associated with substations 133 is a regional control module 112.

The regional control module 112 manages power production, distribution, and consumption within its region. Different regions are interconnected with transmission lines 131, and the transmission lines can be closed or opened through the circuit breakers located in the substations 133. Each regional control module 112 is communicatively coupled to a centralized control system 111 via, e.g., a wide area network 167. The power plant interfaces with the regional grid via a local control module 113. The local control module 113 can standardize control command responses for generator on/off status change and generation level adjustments issued by regional control module 133 or the centralized control system 111.

Still referring to FIG. 1C, the control system 111 includes a transceiver 115 for exchanging data between the control system and regional control modules 112 via the network 167. Also, control system 111 includes one or several processors 116A and 116B to manage the operation and control of the power system, including the microgrid, 101 and adjacent power grids, 102 and 103. The control system 111 is operable to manage the interaction of several regional control modules 112 and the power plants under their control. To that end, the centralized control system 111 make decisions for regional grid interconnection or major generator connection to the grid. The regional control module 112 makes the decision for connecting local stand-alone operated generators into its regional grid. For example, the control system 111 can issue a command to the regional control module 112 to connect its controlled regional grid with an adjacent regional grid. The synchronization controllers 105 described by some embodiments of the disclosure are used to support synchronization of the microgrid 101 with adjacent grids, 102 and 103.

Still referring to FIG. 1C, the synchronization controllers are installed for each generator of power generation plants, 121 and 122 within the microgrid 101 for supporting the synchronization of the microgrid 101 with adjacent grids 102 or 103. If the generator is located close to the point of common coupling between the microgrid and the adjacent power grid to be interconnected, it uses the local measurements collected from both sides of the circuit breaker or switch between the microgrid and the identified adjacent power grid, and sum of required synchronization corrections from synchronization controllers of neighboring generators to simultaneously regulate the frequency and voltage by adjusting the active and reactive powers of the generator during the synchronization process. When an interconnection command is issued either by the regional control module 112, or by the centralized control system 111, the synchronization controllers 105 activate the synchronizing process, and close the circuit breaker or switch at the substation 133 when predetermined thresholds are met for differences of synchronization parameters between two grids to be connected. The synchronization parameters may include frequency, phase angle, voltage amplitude, and phase sequence. The grid interconnection command can be made when there is a need in the power system, such as sudden load changes.

Still referring to FIG. 1C, the control of generators, 121 and 122 can be structured into hierarchical levels, including primary, secondary, and tertiary controls. The primary control is realized in the local control module 113 using droop laws whose primary objectives are to maintain synchronism and achieve weighted power sharing among generators. The secondary control can be implemented either in a centralized manner by implemented in the regional control module 112, or in a distributed manner by implemented in the local control module 113. The goal of the secondary control is to eliminate the steady-state deviations between the microgrid frequency and voltage and their nominal values that caused by droop control without disturbing the power sharing and synchronism among the generators. The tertiary control is implemented in the centralized control system 111 to perform functions such as optimizing the active and reactive power exchange between the microgrid and the adjacent power grids based on the prevailing energy prices, market conditions, and information from the independent system operators. The synchronization control 105 is built upon the local control module 113 for each generator in the power plants of the microgrid to share the responsibility for interconnecting the microgrid, 101 with adjacent power grids, 102 or 103.

Microgrid

Figure 2A:
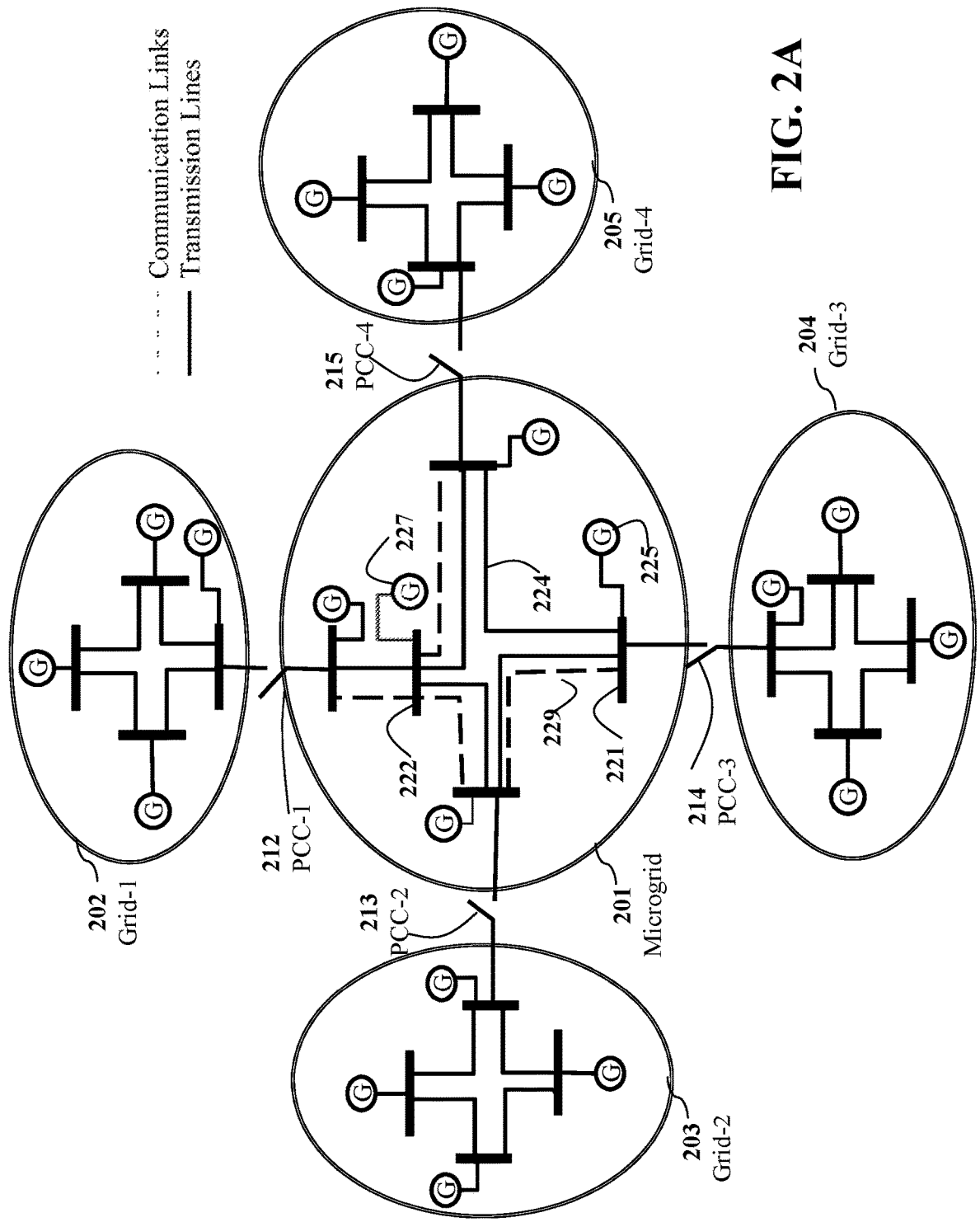
FIG. 2A is a schematic diagram illustrating a microgrid synchronization with adjacent power grids with multiple points of common coupling through distributed synchronization controls of distributed generators, according to some embodiments of the present disclosure.

FIG. 2A is a schematic diagram illustrating an example of a microgrid synchronization with adjacent power grids with multiple points of common coupling (PCCs), according to some embodiments of the present disclosure. In FIG. 2A, the microgrid 201 has 4 different points of common coupling (PCC), PCC-1 212, PCC-2 213, PCC-3 214 and PCC-4 215 that enable the microgrid 201 connecting with adjacent power grids, Grid-1 202, Grid-2 203, Grid-3 204, and Grid-4 205. The adjacent grid can be a main power grid, or one other microgrid. Each point of common coupling is connected with one bus of the microgrid 201 with one bus of adjacent power grid through an open circuit breaker, or switch.

The microgrid 201 includes a set of distributed generators, 225 and 227 which are connected with the microgrid 201 through buses 221 and 222 and transmission lines 224. Some buses 221 are connected with the points of common coupling, and the generator connected to such buses, 225 are treated as leader generator during the synchronization process. Some other buses 222 are not connected with the points of common coupling, and the generator connected to those buses, 227 are treated as follower generator during the synchronization process. The control/state signals for distributed generators are exchanged through corresponding communication links 229 between neighboring generators. The configuration of communication network is reconfigured based on the point of common coupling to be used, and the operation states of microgrid. Through the communication network, the synchronization controller of each generator can exchange the synchronization control/state information with its neighboring generator controllers. If the generator is a leader generator, its synchronization control also can get the synchronization parameters at both sides of the point of common coupling between the microgrid and the adjacent power grid.

The distributed generator in the microgrid can be a machine based generator which commonly used by a conventional power plant, or a converter based generator which commonly used by a power plant with renewable energy. Although the internal controls of different types of generators may be very different and same functions may be implemented at different time scales, both the machine and converter based generators can be represented as voltage source whose amplitude and frequency can regulate by the system-level control according to the operation needs of the microgrid. Essentially, the internal controls of a generator help realize the voltage source behavior with controllable voltage amplitude and frequency. Since internal control functions are much faster than the system-level control, they do not interfere with the system control dynamics. Some generators may not participate in the system-level control for maintaining the stability of microgrid voltage and frequency. They only feed active and reactive powers to the microgrid and can be appropriately called non-controllable generators instead of the controllable generators that participate in maintaining the grid voltage and frequency. The non-controllable generators can be treated as loads with negative power demands. As system level control, the synchronization of the microgrid with adjacent power grids is achieved by controlling of controllable distributed generators within the microgrid.

Figure 2B:
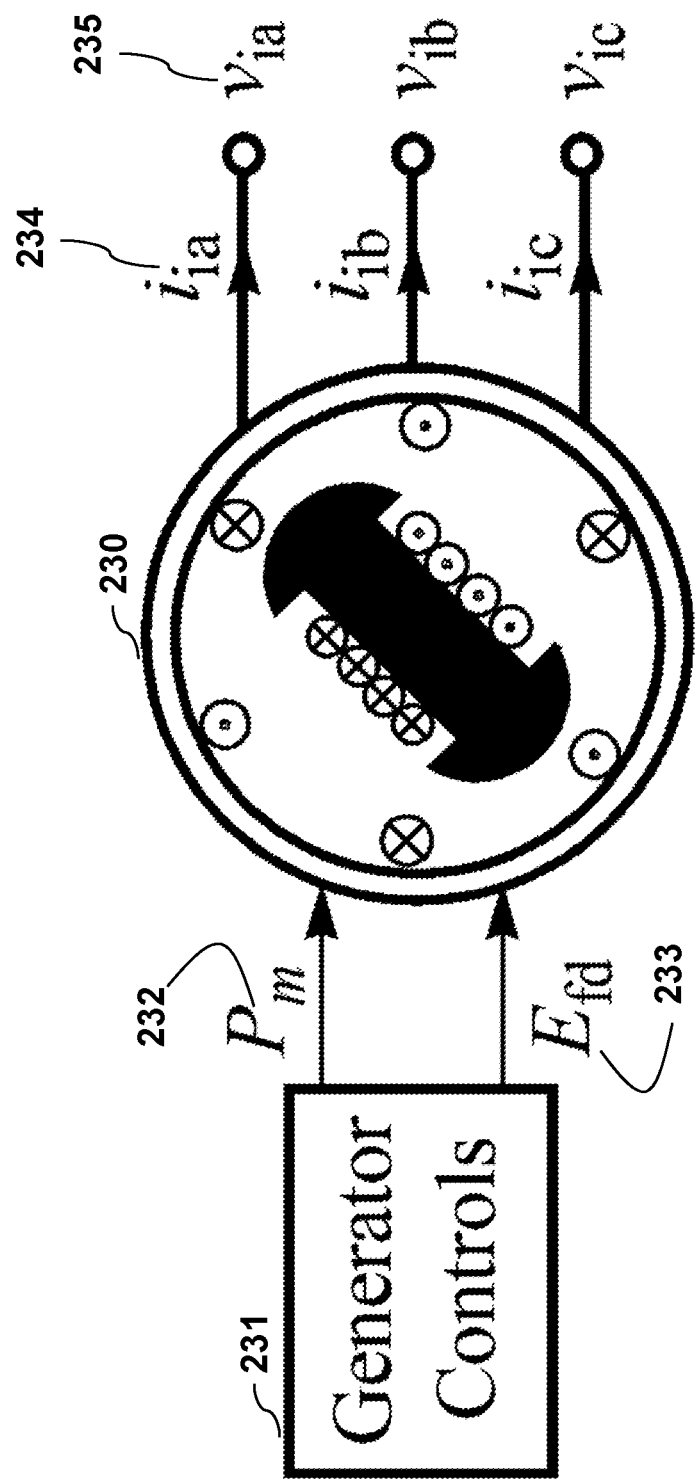
FIG. 2B is a schematic diagram illustrating a first type of distributed generator used in microgrids, a synchronous generator, i.e. a machine based controllable generator, according to some embodiments of the present disclosure.

FIG. 2B is a schematic diagram illustrating a synchronous generator, 230, i.e. a machine based controllable generator, according to some embodiments of the present disclosure. The generator outputs three phase voltages and currents, 235 and 234. The frequency and magnitude of the voltages can be regulated through controlling the mechanical input power 232 and excitation voltage 233 of the generator by using generator controllers 231.

Figure 2C:
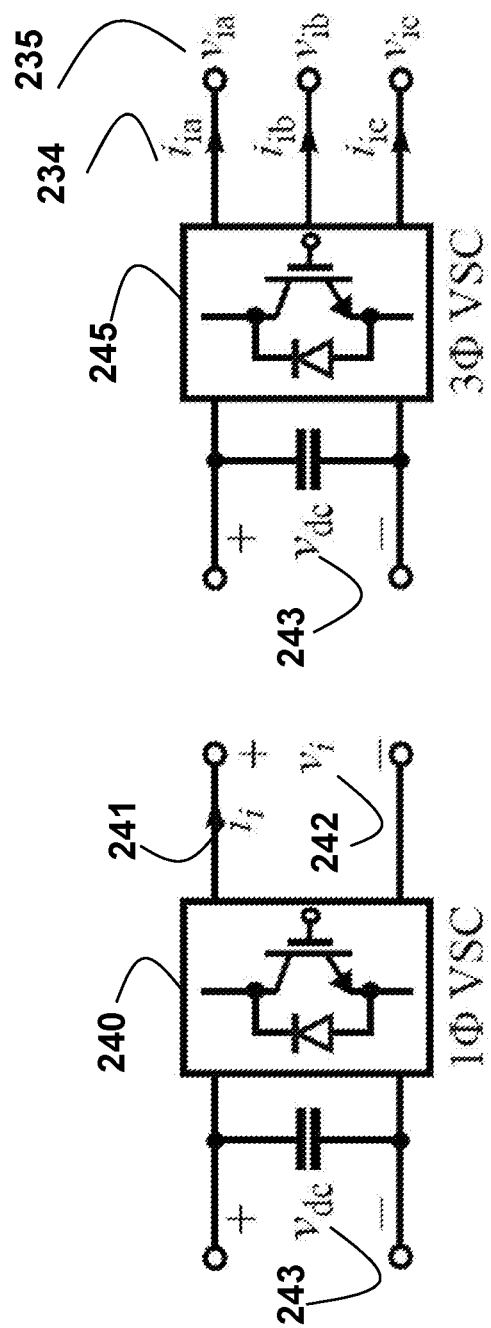
FIG. 2C is a schematic diagram illustrating a second type of distributed generator that used in micro-grids, a convertor based controllable generator, including a single-phase voltage source converter (VSC), and a three-phase voltage source converter, according to some embodiments of the present disclosure.

FIG. 2C is a schematic diagram illustrating converter based controllable generators, including a single-phase voltage source converter (VSC), 240 and a three-phase voltage source converter, 245, according to some embodiments of the present disclosure. The single-phase and three-phase converters, 240 and 245 provides single-phase AC voltage and currents, 242 and 241, and three-phase AC voltages and currents, 235 and 234 by converting energy resource from DC source 243 into AC sources, respectively.

Figure 2D:
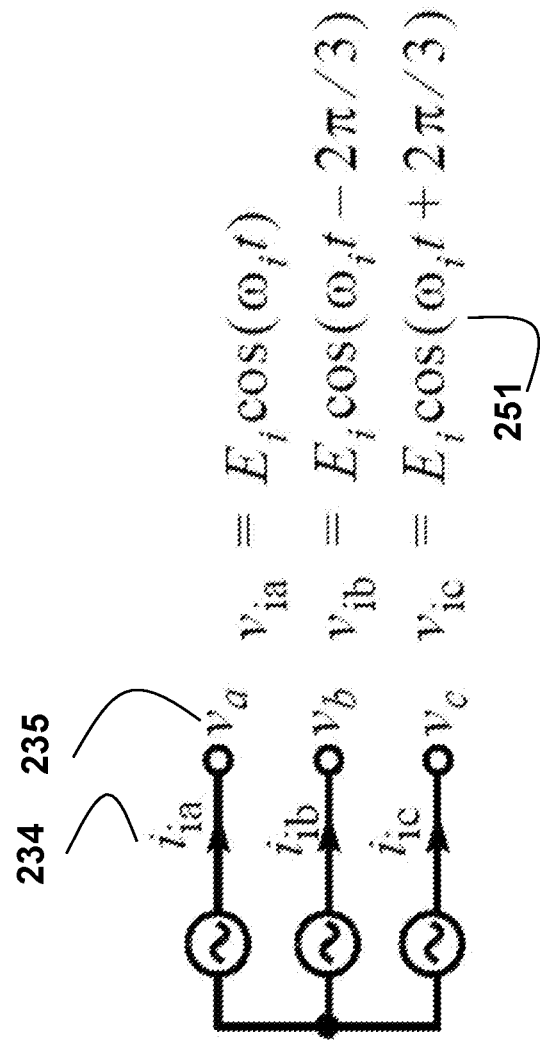
FIG. 2D is a schematic diagram illustrating equivalent representation of single and three phase generators for slow primary and secondary level controls, which regulate the generator output voltage and frequency, according to some embodiments of the present disclosure.
Figure 2D:
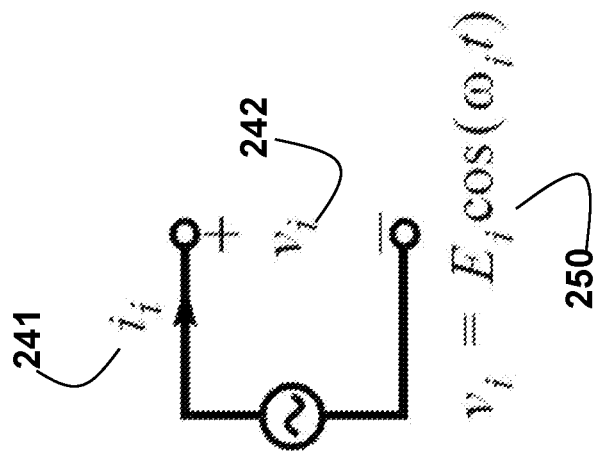

FIG. 2D is a schematic diagram illustrating equivalent representation of single and three phase generators for primary and secondary level controls, which regulate the generator output voltage $E_i$ and frequency $\omega_i$, according to some embodiments of the present disclosure. A single phase generator 250 generates AC voltage and current only on a given phase, 242 and 241. In comparison, a three phase generator can generate AC voltages and currents, 235 and 234 on all three phases.

The microgrid relies on its communication layer for information exchanges between controllable generators to implement the synchronization control at multiple points of interconnections. The synchronization is implemented based on consensus based distributed control strategy. Each distributed generator needs to coordinates only with a few neighbors, leading to a sparse communication network. The bi-directional communication links are used between two generators, that means a generator can send and receive information to and from its neighbors. In addition, the generators located at the point of common coupling can also receive the measurements and information from the adjacent power grids that connected to the same point of common coupling. The communication links between the generator located at a point of common coupling and its neighbors can be reconfigured as single-directional during the synchronization process, to only enable the leader generator to send its information out but disable the leader generator receiving information from its neighbors.

The communication network for the microgrid can be represented as a directed graph described as G(V, E, A), wherein, V={1, ..., n} is the node set, and each node represents a controllable generator, and n is the total number of controllable generators. E⊆V×V is the edge set that includes set of links between different nodes. $A=[a_{ij}]\in \mathbb{R}^{n\times n}$ is the adjacency matrix that embedded information on the connectivity and weights of a directed graph. Each positive weight $a_{ij}$ associates a link between jth node with ith node. For example, if (j, i)∈E and $a_{ij}>0$, then there is a link directed from jth node to ith node, and the ith node can receive information from the jth node. A particular weight $a_{ij}$ is zero, if there is no direct link between the ith and jth nodes. It is to be noted that for an undirected graph, (i, j)∈E implies (j, i)∈E and $a_{ij}=a_{ji}$. In a connected undirected graph, there is an undirected path between any two distinct nodes. A subgraph of a directed graph G(V, E, A) can be a rooted directed spanning tree if it contains all the nodes of the parent directed graph G(V, E, A), and every node has exactly one parent except for the one, which has no parent and it is called root. In a rooted directed tree, a directed path exists from the root to all the other nodes of the tree.

Assume $x_i(t)$ represents an information state associate with an ith node. The most commonly applied algorithm for achieving consensus among the information states of nodes in a graph is:

$$\frac{dx_i}{dt} = -\sum_{j=1}^{n} a_{ij}(x_i - x_j). \quad (1)$$

This algorithm can be implemented either in an averaging mode, or a leader-follower mode. For an undirected connected graph, the averaging mode is used, and the consensus algorithm in (1) results in information states of all nodes to converge to a weighted average of the initial values of the information states. If all non-zero weights $a_{ij}$ are kept equal, the information states will converge to the average of the initial values of the states:

$$x_i(\infty) = \frac{1}{n}\sum_{i} x_i(0), \text{ where } i = \{1, 2, \ldots, n\} \quad (2)$$

One trivial condition is if the information states are at a common value when the consensus algorithm in (1) is initiated, all the states continue to stay at the same common value.

For a directed graph containing exactly one rooted directed spanning tree, the leader-follower mode is used, and the consensus algorithm in (1) results in information states of all the nodes to converge to the information state of the root of the rooted directed spanning tree. It is to be noted that the root node does not receive information from the other nodes and its information state is independent of the other nodes. On the other hand, the information states of the remaining nodes follow the information state of the root node.

Depending on the microgrid operation mode, this invention changes the averaging mode to the leader-follower mode and vice versa. For changing from the averaging mode to the leader-follower mode, a node is selected as the leader and its information state is simply made independent of those of the remaining nodes. For example, if kth node is made leader, weights $a_{kj}$ are made zero without affecting the weights $a_{jk}$. This change is equivalent to converting the undirected branches connected to the kth node to directed branches pointing away from the kth node. Hence, in the leader-follower mode with the kth node as the leader, the consensus algorithm in (1) is modified as:

$$\frac{dx_i}{dt} = -\sum_{j=1}^{n} a_{ij}(x_i - x_j), \text{ where } i = \{1, 2, \ldots, n\}, i \neq k \quad (3)$$

Information state of the kth node, $x_k$ follows an independent reference, $x_{ref}$:

$$x_k = x_{ref} \quad (4)$$

Generator Control

The disclosure implements synchronization control based on droop control laws by adding an additional synchronization layer to the existing droop control based primary and secondary generation control.

The droop-based primary control of the controllable generators is implemented locally at each generator. It provides reference for the magnitude and frequency of the generator output voltage to the fast internal controls of the generator, which implements the voltage source behavior. The magnitude and frequency references for an ith generator, $\omega_i$ and $E_i$ are derived based on the nominal values $\omega_i^*$ and $E_i^*$, droop slopes $m_i$ and $n_i$, and the generator active and reactive power outputs, $P_i$ and $Q_i$:

$$\omega_i = \omega_i^* - m_i \cdot P_i \quad (5)$$

$$E_i = E_i^* - n_i \cdot Q_i \quad (6)$$

Implementation of the droop control laws in (5) and (6) requires measurement of the active and reactive power outputs from the generator using only the local voltage and current measurement $v_i$ and $i_i$. In steady-state, the active and reactive power outputs of a generator depend on the voltage magnitudes and phase-angles at all the buses in the microgrid and the transmission line parameters. If the transmission line impedances are inductive, the steady-state active and reactive power outputs from the ith bus of the electrical network are given as:

$$P_i = \sum_{j=1}^{n} \frac{E_i E_j}{X_{ij}} \sin(\theta_i - \theta_j) \quad (7)$$

$$Q_i = \frac{E_i^2 E_j}{1/(\sum_{j=1}^{n} 1/X_{ij})} - \sum_{j=1}^{n} \frac{E_i E_j}{X_{ij}} \cos(\theta_i - \theta_j) \quad (8)$$

where $E_i$ and $\theta_i$ are respectively the magnitude and phase-angle of voltages at the ith bus of the electrical network which may or may not have a controllable generator connected to it, and $X_{ij}$ is the reactance of the transmission line between ith and jth bus of the network. The reactance $X_{ij}$ is infinite if the two buses are not connected.

Figure 3:
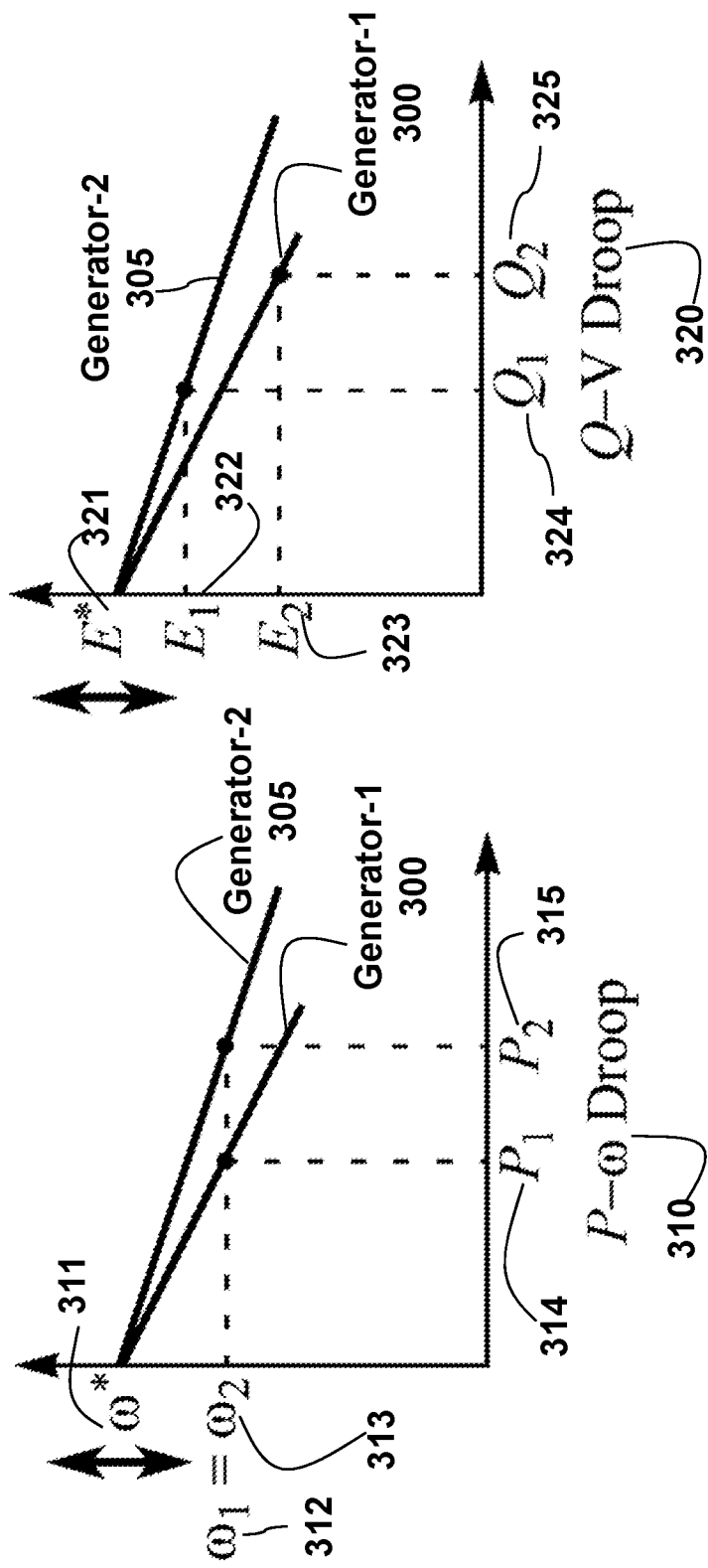
FIG. 3 is graphic plots illustrating a generator primary droop control, according to some embodiments of the present disclosure.

FIG. 3 is a graphic plot illustrating primary droop controls of distributed generators, according to some embodiments of the present disclosure. In the figure, there are two distributed generators, generator-1, 300 and generator-2, 305. The primary controllers regulate the frequencies, 312 and 313, and voltages, 321 and 322 through adjusting the active power outputs, 314 and 315, and reactive power outputs, 324 and 325 based on the nominal values $\omega_i^*$ and $E_i^*$, 311 and 321 according to P–$\omega$ droop characteristics, 310 and Q–V droop characteristics, 320. As shown in the figure, the active power sharing among generators is governed by slopes of P–$\omega$ droop characteristics, because the steady-state frequencies of all the generators are equal. The reactive power sharing, however, is more difficult to achieve because of the voltage drop across transmission lines and more coordination is required for improving the reactive power sharing among generators.

The droop control in principle achieves synchronism and power sharing among generators in an islanded microgrid. However, without compensation, it also leads to steady-state deviations in the frequency and voltage depending on the active and reactive power load on the microgrid. For example, the steady-state frequency of the microgrid, $\omega_{ss}$ is given by:

$$\omega_{ss} = \omega^* + \frac{P_0}{\sum_{i=1}^{n} 1/m_i} \quad (9)$$

where $P_0$ is the total load in the microgrid, the conventional loads introduce negative contributions to $P_0$, and the controllable generators such as current controlled inverters introduce positive contributions to $P_0$. Usually $P_0$ is negative and the steady-state frequency based on (5) is lower than the nominal frequency $\omega^*$.

The steady-state deviations in the frequency and voltage magnitude, for example measured at the point of common coupling (PCC) can be mitigated by a secondary controller. It is evident from (9) that the steady-state errors can be compensated by regulating $\omega^*$ and $E^*$ in the droop control laws (5) and (6), which is equivalent to shifting the droop characteristics vertically for regulating the frequency and voltage.

The secondary controller can be implemented in a centralized manner, and in a distributed manner.

Figure 4A:
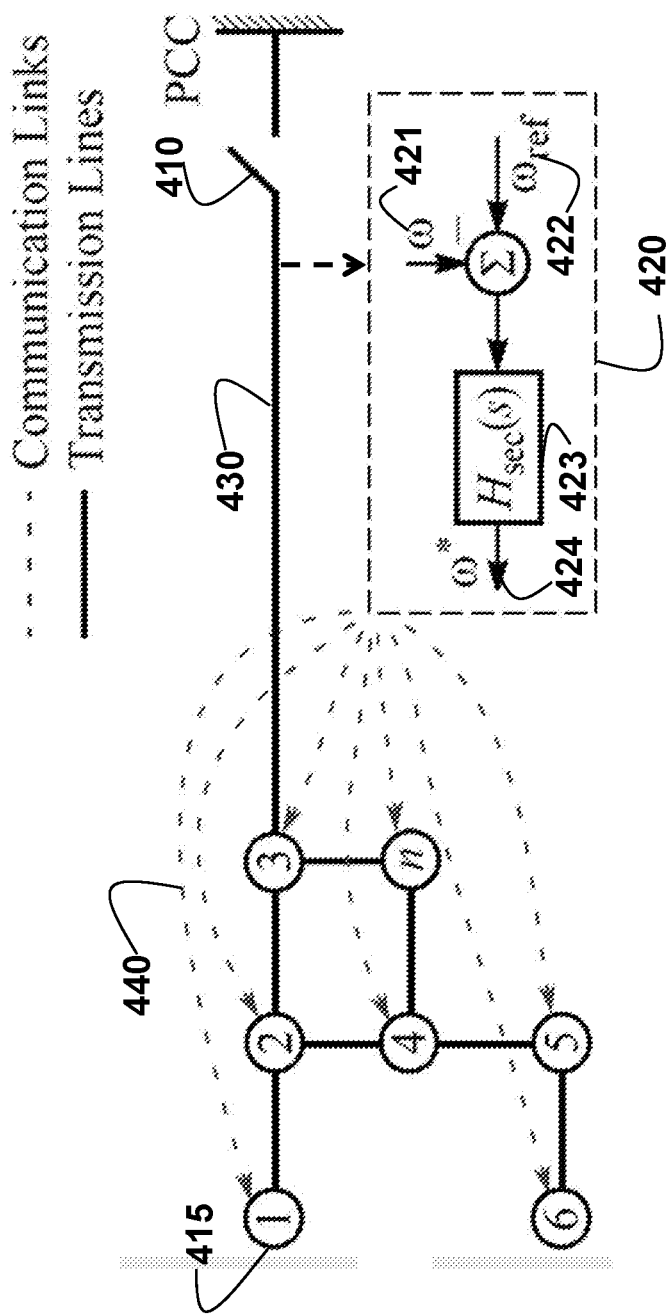
FIG. 4A is a schematic diagram illustrating a generator centralized secondary control, according to some embodiments of the present disclosure.

FIG. 4A is a schematic diagram illustrating a centralized secondary frequency control 420 for distributed generators in the microgrid, according to some embodiments of the present disclosure. The solid lines 430 represent the transmission lines, and the dashed lines 440 represent the communication link. The secondary frequency controller 420 defined by a transfer function $H_{sec}(s)$, 423 and located at the point of common coupling (PCC), 410, processes the error between the frequency $\omega$ 421 at the PCC and reference $\omega_{ref}$ 422 for generating $\omega^*$ 424 for the P–$\omega$ droops laws implemented locally in the primary controllers for each distributed generator 415 in the microgrid.

Secondary voltage control is similarly implemented using the error between the voltage magnitude at the PCC and its reference for generating $E^*$ for the Q–V droops laws in the generator controls. $\omega^*$ and $E^*$ are communicated to all the controllable distributed generators using a low-bandwidth unidirectional communication between the secondary controller at the point of common coupling (PCC) and distributed generators.

Since synchronization parameters of a microgrid such as the voltage magnitude and frequency at the point of common coupling (i.e. PCC) depend on several distributed generators, the synchronization function can be implemented in the secondary generation control. When a microgrid is to be synchronized with the power system at a PCC, the difference between the frequency and voltage magnitudes of the microgrid and the power system can be added to the secondary control to eliminate errors between them. Hence, synchronization of the frequency and voltage levels can be achieved without making fundamental modifications to the secondary control of a microgrid.

The centralized secondary control for microgrid is directly based on the secondary control of main power grids. However, the centralized nature of the secondary control defies the fundamental objective of microgrid of providing an electrical and control infrastructure for the integration of distributed energy resources while keeping the central coordination among the resources at minimum. Two major disadvantages of the centralized secondary control are the existence of a single-point-of-failure and requirement of communication from the secondary controller to each of the controllable generators in the microgrid.

Distributed secondary control methods can be used for the voltage and frequency restoration while eliminating the single point of failure that exists in the centralized secondary control. In distributed secondary control, each of the controllable generators in the microgrid is provided with its own secondary controller to eliminate the local frequency and voltage errors. Obviously, independent secondary controllers may lead to different shifts in the generator droop characteristics and uniformity of $\omega^*$ and $E^*$ at each generator may not be ensured. This will disturb the active and reactive power sharing among the generators. Hence, each of the distributed secondary control methods requires a framework for coordinating secondary controllers of the individual distributed generators. Therefore, each controllable generator requires frequency, voltage, and reactive power output information of all the other controllable generators, then it may lead to a very dense communication network among the generators.

Figure 4B:
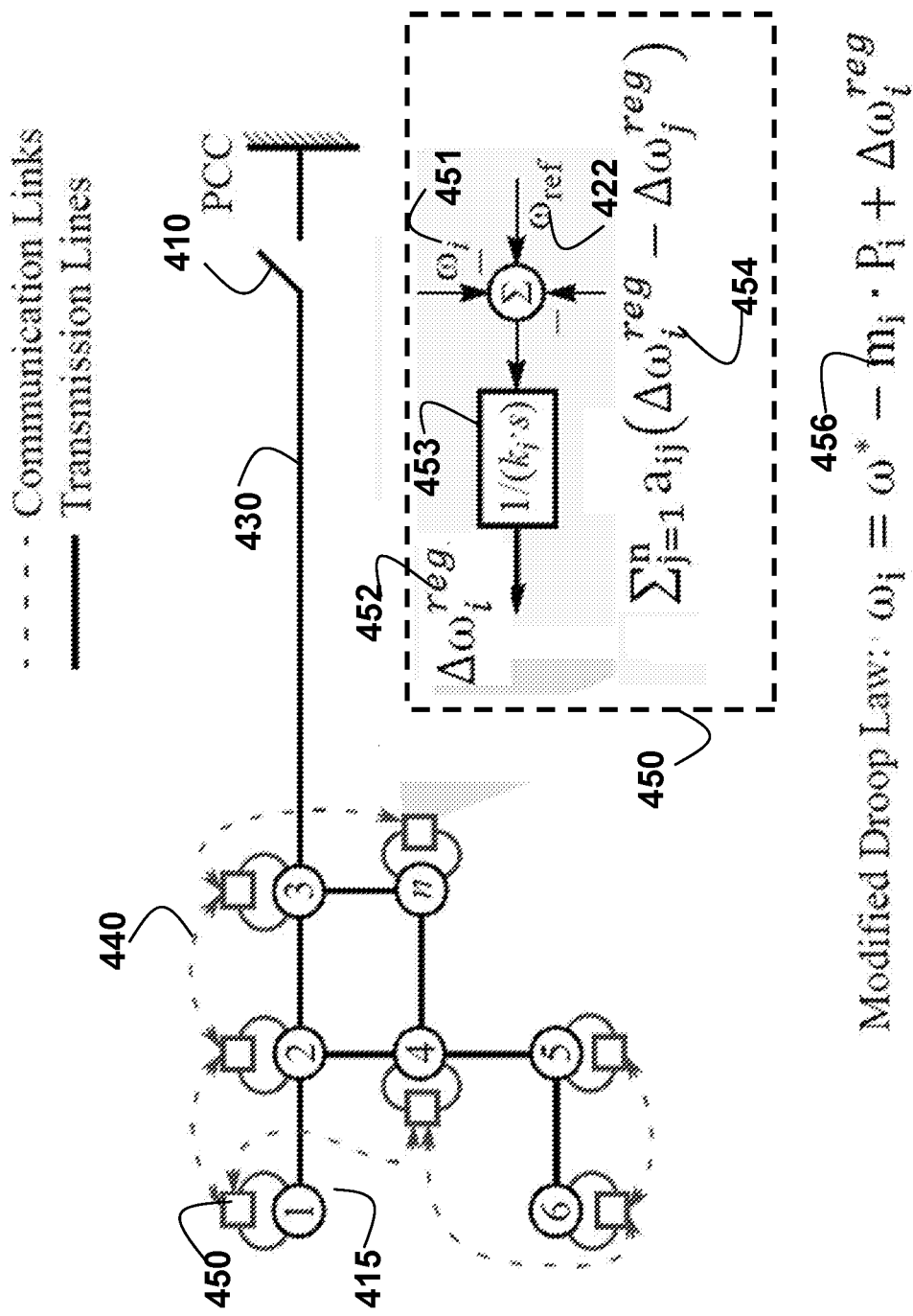
FIG. 4B is a schematic diagram illustrating a generator consensus-based distributed secondary control, according to some embodiments of the present disclosure.

FIG. 4B is a schematic diagram illustrating a consensus-based distributed secondary control, according to some embodiments of the present disclosure. The consensus-based distributed secondary control pushes secondary controller 450 into each controllable generator 415. Secondary controllers inside the controllable generators add offsets to the droop laws (5) and (6) to achieve the frequency and voltage restoration. To achieve the active and reactive power sharing objectives, consensus among the offsets from the distributed secondary controllers is achieved through sparse communication network, as shown using dashed lines 440. Taken frequency as example, the secondary frequency controller 450 using an integrator 453, processes the error between the frequency $\omega_i$ 451 of the generator and reference $\omega_{ref}$ 422, and the weighted sums of frequency offsets from neighboring generators 454 for generating a frequency offset $\Delta\omega_i^{reg}$ 452 for reconfiguring the P–$\omega$ droops laws implemented locally in the primary controllers for each distributed generator 415 in the microgrid. With the addition of frequency offset, the droop law for the primary control is modified accordingly, 456.

The updated P–$\omega$ droop characteristics in the consensus-based distributed secondary control is given by:

$$\omega_i = \omega^* - m_i \cdot P_i + \Delta\omega_i^{reg} \quad (10)$$

where $\Delta\omega_i^{reg}$ is the offset added by the secondary controller to restore the generator frequency $\omega_i$ back to the nominal value $\omega^*$. The offset $\Delta\omega_i^{reg}$ is updated based on the following consensus law:

$$k_i^\omega \frac{d\Delta\omega_i^{reg}}{dt} = -(\omega_i - \omega^*) - \sum_{j=1}^n a_{ij}(\Delta\omega_i^{reg} - \Delta\omega_j^{reg}) \quad (11)$$

The first part on the right-hand side of (11) ensures that the error between the generator frequency $\omega_i$ and nominal reference $\omega^*$ converges to zero in the steady-state. The second part is identical to the consensus algorithm in (1) and it ensures that offset $\Delta\omega_i^{reg}$'s of all the controllable generators are equal in the steady-state. This preserves the active power sharing among generators based on the droop slopes, $m_i$ while achieving frequency restoration.

Based on the averaging mode of the consensus algorithm, the consensus among the offsets, $\Delta\omega_i^{reg}$ only requires that the undirected graph formed by bidirectional communication links among the controllable generators is connected. Hence, each generator does not require communication links with all the remaining generators.

Consensus-based distributed voltage control is similarly achieved by introducing an offset term to the Q–V droop characteristic of the controllable generators. However, since the voltage restoration at all generators in a microgrid and perfect reactive power sharing are conflicting conditions owing to the voltage drop across transmission lines, a compromise between the two is achieved by a consensus algorithm considering errors both in the local voltage magnitude and the reactive power sharing with neighboring generators.

The consensus-based distributed secondary control mitigates the two demerits of the centralized secondary control: it achieves frequency and voltage restoration without needing a dense communication network and without introducing a single-point-of-failure. However, the frequency and voltage references, $\omega^*$ and $E^*$, are fixed in the existing consensus-based distributed secondary control. Hence, the distributed secondary control is not feasible for achieving microgrid synchronization with another power system, which will require tracking a time-varying frequency and voltage levels of the power system before the microgrid can be connected with the power system.

Another demerit of the centralized secondary control is that it supports only one point of interconnection. For instance, if there is an additional point of interconnection in the microgrid shown in FIG. 2A, additional secondary controller with remote sensing circuit is required at the new PCC if synchronization at a power system at the new PCC is desired. Moreover, synchronization at the new PCC will also require communications links from the new PCC to all the controllable generators. Hence, the communication infrastructure becomes increasing dense as the number of points of interconnection in an islanded microgrid becomes high. Nonetheless, it may be desired to connect multiple micro-grids for improving reliability, which may lead to multiple points of interconnection.

The objectives of the disclosed distributed synchronization method are to enable synchronization of a microgrid at multiple points of interconnection without requiring separate communication network for each interconnection point and without introducing a single-point-of-failure. To achieve these objectives, the disclosed distributed synchronization control method modifies the consensus-based distributed control method by introducing two information states in the droop control, one each for the P–$\omega$ and Q–V droop control laws. Each of these information states essentially modifies the nominal frequency and voltage references depending respectively on the frequency and voltage of the adjacent power grid with which the microgrid is to be synchronized.

Figure 5A:
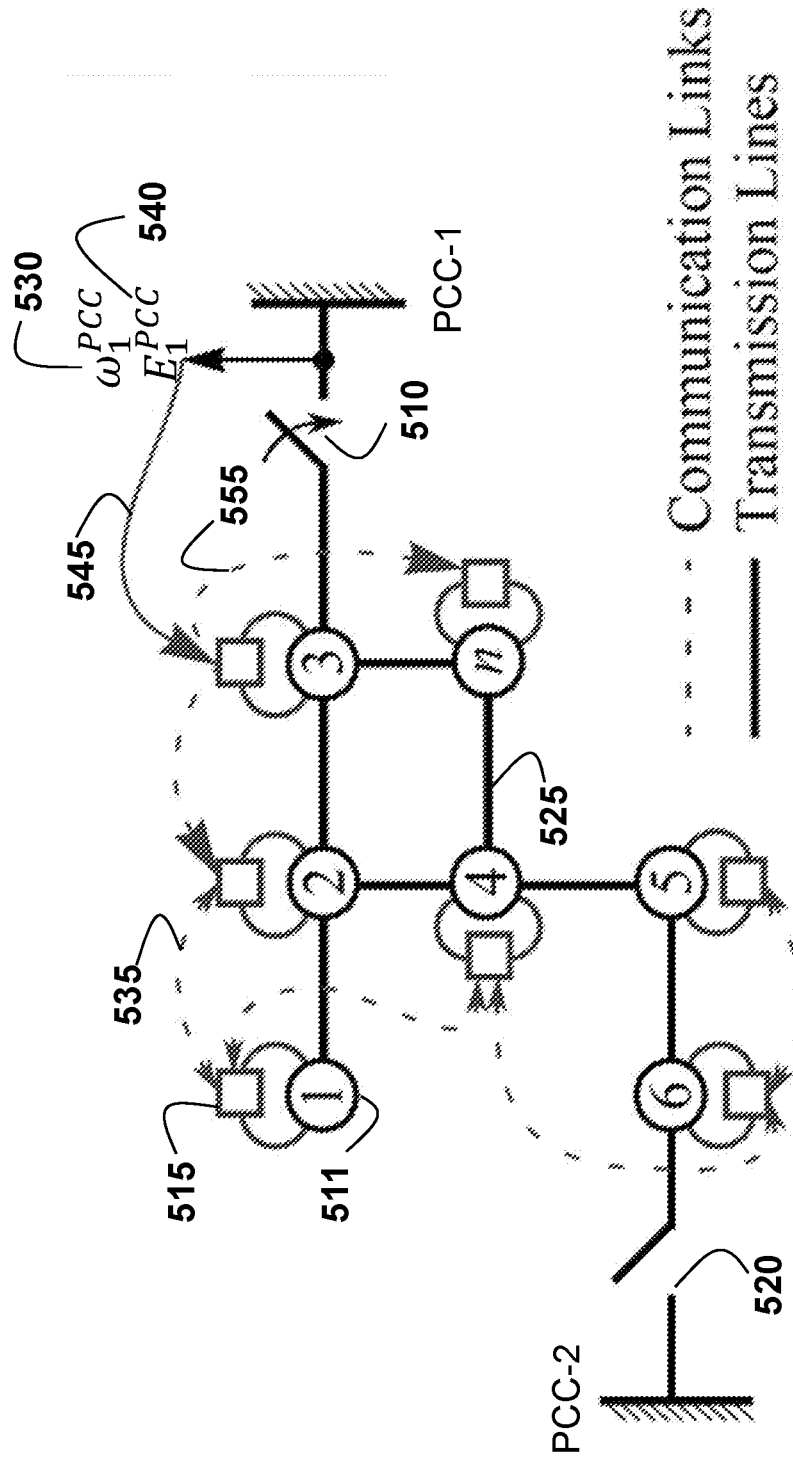
FIG. 5A is a schematic diagram illustrating a distributed synchronization control using leader-follower mode for synchronization at a first point of common coupling, PCC-1, according to some embodiments of the present disclosure.

FIG. 5A is a schematic diagram illustrating a distributed synchronization control using leader-follower mode for synchronization at a first point of common coupling, PCC-1, according to some embodiments of the present disclosure. Each node represents a distributed generator. A solid line represents the physical connections between generators, and a dashed line represents a communication line between generators' controllers. The microgrid has two possible points of common coupling, 510 and 520. It includes a set of controllable distributed generators 511 and each generator is controlled by a synchronization controller 515. The generators are connected through transmission lines 525. Meanwhile, the synchronization controller of each generator is enabling to have bi-way communicating 535 with corresponding controllers of neighboring generators corresponding controllers of neighboring generators, if the generator is a follower generator. In contrast, the synchronization controller of a leader generator can only have one-way communication 545 for sending its states to neighboring generators' synchronization controllers. The frequency 530 and voltage 540 at the side of point of common coupling to the adjacent power grid to be connected are used for configuring the distributed synchronization controllers.

Figure 5B:
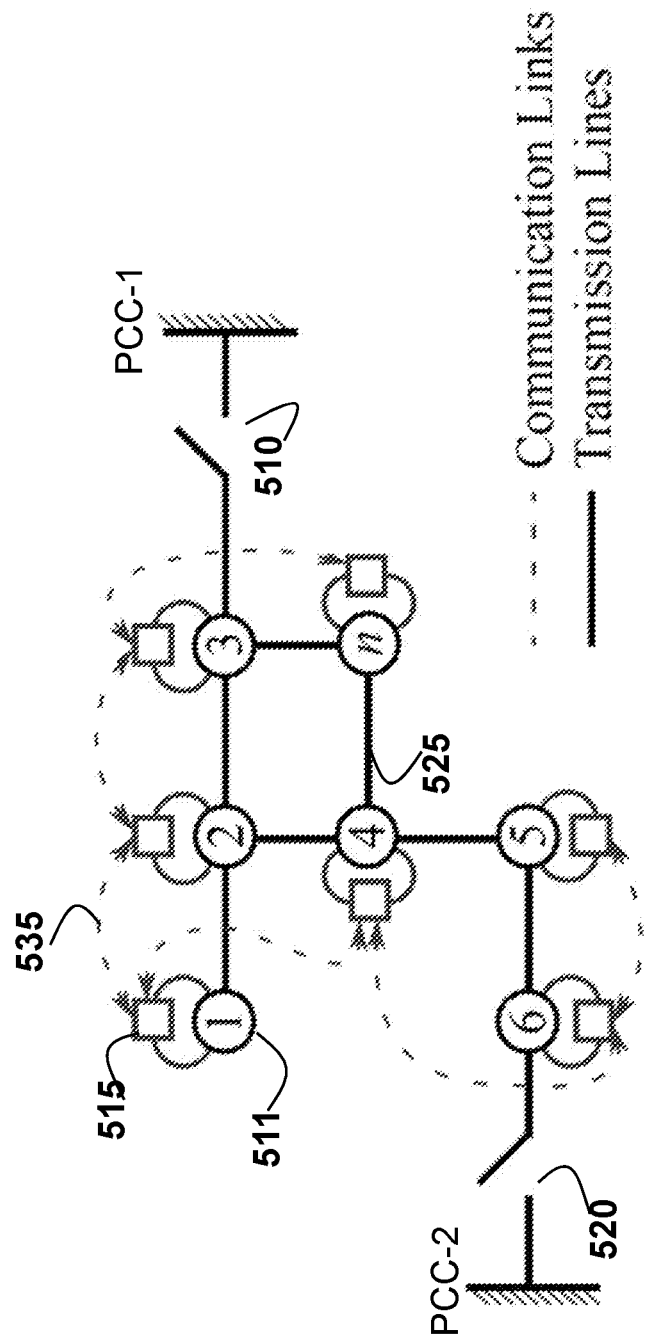
FIG. 5B is a schematic illustrating a distributed synchronization control using averaging mode for synchronized operation, either islanded or grid-connected, according to some embodiments of the present disclosure.

FIG. 5B is a schematic illustrating a distributed synchronization control using averaging mode for synchronized operation mode, according to some embodiments of the present disclosure. The synchronized operation mode can be an isolated operation mode, or a grid-connected operation mode.

Figure 5C:
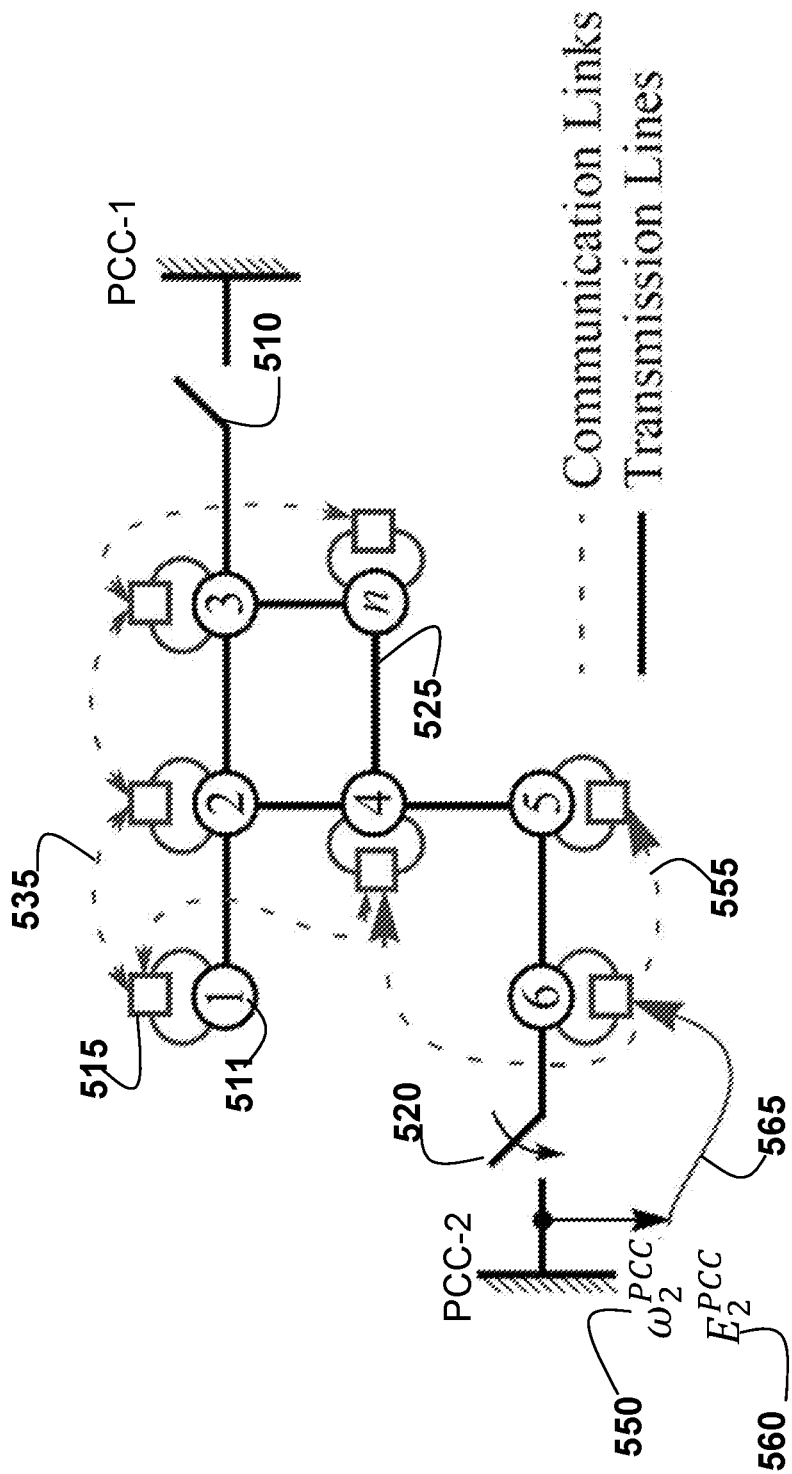
FIG. 5C is a schematic illustrating a distributed synchronization control using leader-follower mode for synchronization at a second point of common coupling, PCC-2, according to some embodiments of the present disclosure.

FIG. 5C is a schematic illustrating a distributed synchronization control using leader-follower mode for synchronization at a second point of common coupling, PCC-2, according to some embodiments of the present disclosure. The frequency 550 and voltage 560 at the side of point of common coupling to the adjacent power grid to be connected are used for configuring the distributed synchronization controllers.

By adding an information state $\Delta\omega_i^{syn*}$ to the nominal reference $\omega^*$, the updated frequency droop control law for an ith generator can be described as:

$$\omega_i = (\omega^* + \Delta\omega_i^{syn*}) - m_i \cdot P_i + \Delta\omega_i^{reg} \text{ where } i = \{1, 2, \ldots, n\} \quad (12)$$

The consensus-based distributed secondary controller output $\Delta\omega_i^{reg}$ is updated based on the following consensus law:

$$k_i^\omega \frac{d\Delta\omega_i^{reg}}{dt} = -[\omega_i - (\omega^* + \Delta\omega_i^{syn*})] - \sum_{j=1}^n a_{ij}(\Delta\omega_i^{reg} - \Delta\omega_j^{reg}) \quad (13)$$

It is to be noted that the consensus law in (13) is identical to that in (11) except for the fact that the frequency reference is modified to include the correction term $\Delta\omega_i^{syn*}$. With this modification, the distributed secondary frequency control will track the time-varying frequency reference depending on the time-varying correction $\Delta\omega_i^{syn*}$.

Two microgrid operation modes, one is leader-follower mode, and the other is averaging mode, decide how the frequency reference correction $\Delta\omega_i^{syn*}$ at each of the controllable generators is obtained:

If the microgrid is to be synchronized at a point of interconnection near say kth generator, the leader-follower mode is used, the frequency reference correction at the kth generator $\Delta\omega_k$ is obtained using the difference between the measured frequency of the adjacent power grid with which the microgrid is to be synchronized, $\omega_k^{PCC}$ and the nominal reference $\omega_k^*$:

$$\Delta\omega_k^{syn} = \omega_k^{PCC} - \omega_k^* \quad (14)$$

Equation (14) is usually used when the frequency difference between two sides of point of interconnection is bigger than a pre-determined threshold. Otherwise, the phase angle at the adjacent power grid to be connected is used according to:

$$\Delta\omega_k^{syn} = \frac{d\theta_k^{PCC}}{dt} - \omega_k^* \quad (15)$$

where $$\frac{d\theta_k^{PCC}}{dt}$$

is the derivative of phase angle of the adjacent power grid to be connected measuring at the point of interconnection with time, and can be approximately calculated as $$\frac{\Delta\theta_k^{PCC}}{\Delta t}, \Delta\theta_k^{PCC}$$

is phase angle change for a duration of time $\Delta t$.

The frequency reference corrections at the remaining generators is obtained based on the following consensus law:

$$k_s^\omega \frac{d\Delta\omega_k^{syn}}{dt} = -\sum_{j=1}^n a_{ij}(\Delta\omega_i^{syn} - \Delta\omega_j^{syn}) \cdot \text{where } i = \{1, 2, \ldots, n\}, \quad (16)$$
$$i \neq k$$

It can be inferred from (14), (15) and (16) that the frequency correction information states follow the leader-follower model with generator k being the leader. Hence, in the steady-state, the frequency reference of each of the generators will follow the frequency of the adjacent power grid with which the microgrid is to be synchronized.

When microgrid is returned from synchronizing mode to synchronized mode, either islanded or grid-connected mode, there is no need to keep one generator as the leader. Hence, the update law for the frequency correction information states is switched to the averaging mode:

$$k_s^\omega \frac{d\Delta\omega_i^{syn}}{dt} = -\sum_{j=1}^n a_{ij}(\Delta\omega_i^{syn} - \Delta\omega_j^{syn}) \cdot \text{where } i = \{1, 2, \ldots, n\} \quad (17)$$

Transition from averaging mode for synchronized operation to leader-follower mode for microgrid synchronization can simply be achieved by modifying the frequency correction state at the leader generator to (14). It is to be noted from FIG. 5A-5C that the graph formed by the communication links in the averaging mode is undirected and connected. Whereas, the communication graph in the leader-follower mode becomes directed at the links connected to the leader are modified from undirected bidirectional communication link to unidirectional links directed away from the leader.

In steady-state, all the frequency correction states, $\Delta\omega_i^{syn}$ are equal to the leader state $\Delta\omega_k^{syn}$ in the leader-follower mode. They will continue to stay at the same value when the leader-follower mode is changed to the averaging mode. Hence, transition from the leader-follower mode to the averaging mode is generally smooth. However, transition from the averaging mode to the leader-follower mode is not smooth since the leader node will be the first to have information on the steady-state frequency correction state. The frequency correction states of the follower nodes will converge to that of the leader node with the convergence rate depending on the speed of communication and the communication network topology. Hence, it may happen that the leader generator starts changing its frequency toward that of the adjacent power grid with which the microgrid is to be synchronized faster than the remaining generators can follow. This may transiently disturb the active power sharing among generators and may overload certain generators in the microgrid. To avoid such transient overloading, the frequency reference correction state at each generator is passed through a low-pass filter before using it in the frequency droop control law and the distributed secondary frequency control. The output of the low-pass filter is indicated by an asterisk in (12) and (13) as $\Delta\omega_i^{syn*}$. The frequency correction information state and the output of the low-pass filter are related as:

$$\frac{\Delta\omega_i^{syn*}}{\Delta\omega_i^{syn}} = \frac{1}{1 + T_{fil}^\omega \cdot s}, \quad (18)$$

that is, the derivative of filtered frequency synchronization correction with time, $$\frac{d\Delta\omega_i^{syn*}}{dt}$$

is set as the difference between the original correction and the filtered correction divided by the filter's time constant:

$$\frac{d\Delta\omega_i^{syn*}}{dt} = \frac{1}{T_{fil}^\omega}(\Delta\omega_i^{syn} - \Delta\omega_i^{syn*}).$$

The time-constant of the low-pass filter $T_{fil}^\omega$ is kept few tens of times higher than the convergence rate of the consensus algorithm. Essentially, the low-pass filter ensures that the frequency control at each generator is sufficiently slower than the consensus algorithm (16) for the distributed synchronization to avoid transient overloading of generators.

The steady-state active power sharing performance is unaffected by the introduction of the distributed frequency synchronization control loop; and the transient effects are minimized by decoupling the consensus algorithm of the frequency synchronization control and the generator frequency control.

Distributed voltage synchronization can be similarly achieved as the frequency synchronization by introducing an information state in the Q–V droop control law representing correction to the voltage reference E*. It can be also updated based on the consensus-based distributed control laws. For simplification purpose, it is treated as zero in this invention. The reactive power sharing can also be ignored by setting droop slopes as zero, and then voltages at each generator are regulated to be equal in the steady state.

For distributed voltage synchronization, a voltage reference correction information state $\Delta E_i^*$ is introduced at each controllable generator as:

$$E_i = E^* + \Delta E_i^{syn*} - n_i \cdot Q_i + \Delta E_i^{reg} \text{ where } i = \{1, 2, \ldots, n\} \quad (19)$$

$\Delta E_i^{reg}$ is the secondary voltage control offset. Different formulations can be used based on the control needs. It can be also updated based on the consensus-based distributed control laws. For simplification purpose, it is treated as zero in this invention.

Same as the distributed frequency synchronization, the voltage correction state $\Delta E_i^{syn*}$ is determined using either of leader-follower mode, or averaging mode. If the microgrid is to be synchronized at a point of interconnection near say kth generator, the voltage reference correction at the kth generator $\Delta E_k^{syn}$ is obtained using the difference between the measured voltage of the adjacent power grid with which the microgrid is to be synchronized, $E_k^{PCC}$ and the nominal reference $E_k^*$:

$$\Delta E_k^{syn} = E_k^{PCC} - E_k^* \quad (20)$$

The voltage reference corrections at the remaining generators is obtained based on the following consensus law:

$$k_s^E \frac{d\Delta E_i^{syn}}{dt} = -\sum_{j=1}^n a_{ij}(\Delta E_i^{syn} - \Delta E_j^{syn}) \cdot \text{where } i = \{1, 2, \ldots, n\}, \quad (21)$$
$$i \neq k$$

It can be inferred from (19) and (20) that the voltage correction information states follow the leader-follower model with generator k being the leader. Hence, in steady-state, the voltage reference of each of the generators will follow the voltage of the adjacent power grid with which the microgrid is to be synchronized.

When microgrid is returned from synchronization mode to synchronized mode, there is no need to keep one generator as the leader. Hence, the update law for the voltage correction information states is switched to the averaging mode:

$$k_s^E \frac{d\Delta E_i^{syn}}{dt} = -\sum_{j=1}^n a_{ij}(\Delta E_i^{syn} - \Delta E_j^{syn}) \cdot i = \{1, 2, \ldots, n\} \quad (22)$$

Same as the distributed frequency synchronization, the consensus law of the distributed voltage synchronization is decoupled from the generator voltage control by passing the voltage correction information states at each generator through a low-pass filter before using them in the generator voltage control:

$$\frac{\Delta E_i^{syn*}}{\Delta E_i^{syn}} = \frac{1}{1 + T_{fil}^E s}, \quad (23)$$

that is, the derivative of the filtered voltage synchronization correction with time, $$\frac{d\Delta E_i^{syn*}}{dt}$$

is set as the difference between the original correction and the filtered correction divided by the filter's time constant, $T_{fil}^E$:

$$\frac{d\Delta E_i^{syn*}}{dt} = \frac{1}{T_{fil}^E}(\Delta E_i^{syn} - \Delta E_i^{syn*}).$$

EXAMPLE

Figure 6:
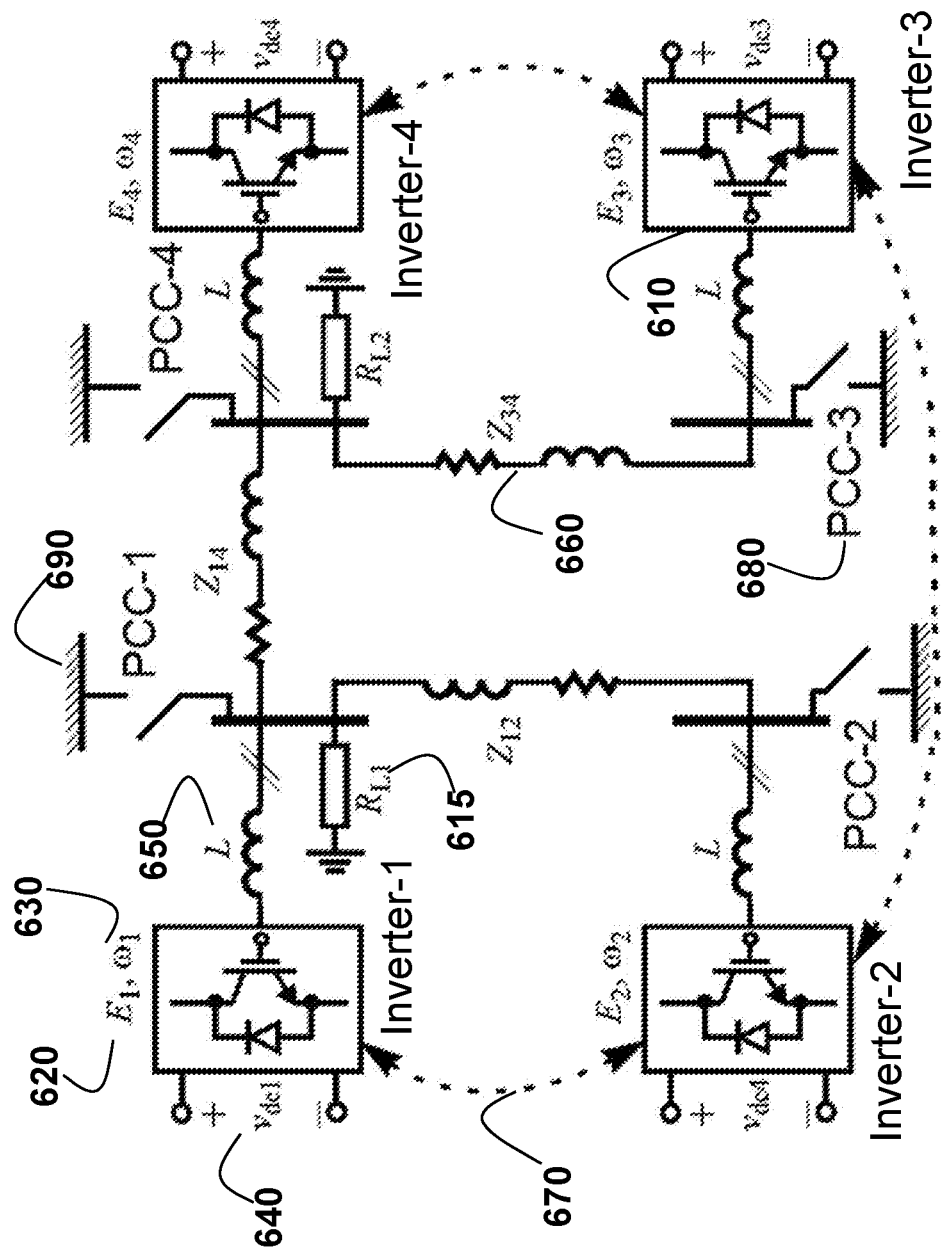
FIG. 6 is a schematic illustrating an exemplar microgrid with four inverters and two resistive loads, according to some embodiments of the present disclosure.

FIG. 6 is a schematic illustrating a simulated microgrid with four inverters, 610 acting as controllable generators, and two resistive loads 615, $R_{L1}$ and $R_{L2}$ at the inverter-1 and inverter-4 buses, wherein the dashed lines show communication links, according to some embodiments of the present disclosure. There are four points of common coupling (PCC) 680 existing for connecting the microgrid with adjacent power grids, 690 which modelled as infinite-bus AC systems with constant frequency and constant voltage magnitude. Each invertor 610 is supplied by a DC source 640, and simulated as ideal single-phase voltage source with controllable voltage amplitude, 620 and frequency 630, and the fast dynamics of internal controls of inverters are ignored. $R_{L1}$ is a fixed 2.0 kW load, $R_{L2}$ is a flexible load varied between 2.0~4.0 kW. The inverter 610 is connected to the electrical network with a phase reactor with an inductance L, 650 at 1.8 mH. The electrical network includes three transmission lines, 660 between inverter-1 and inverter-2, inverter-1 and inverter-4, and inverter-3 and inverter-4, and the corresponding impedances, $Z_{12}$, $Z_{14}$ and $Z_{34}$ are $0.8+j3.6\times10^{-3}$, $0.4+j1.8\times10^{-3}$, and $0.7+j1.9\times10^{-3}$ respectively. The communication network for the microgrid consists of three communication links, 670 between inverter-1 and inverter-2, inverter-2 and inverter-3, and inverter-3 and inverter-4, and the corresponding bi-directional weights for those links, $a_{12}$, $a_{21}$, $a_{23}$, $a_{32}$, $a_{34}$ are set as 1.0, and all others $a_{ij}$ set as 0. The nominal grid voltage peak, E* is 325.3 V, and nominal frequency, $\omega$* is $2\pi \cdot 60$ rad/s.

Each inverter in the microgrid implements the P–$\omega$ droop control law in (12) to derive the frequency reference $\omega_i$. The P–$\omega$ droop law includes information states, $\Delta\omega_1^{reg}$ related to distributed secondary frequency control, and $\Delta\omega_i^{syn*}$ related to distributed synchronization control. The P–$\omega$ droop slopes of inverter-1 and inverter-4, $m_1$ and $m_4$ are set as $2.5\times10^{-3}$, and the slopes for inverter-2 and inverter-3, $m_2$ and $m_3$. are set as $5.0\times10^{-3}$. For simplification, the reactive power sharing is not considered by setting the Q–V droop slopes for each inverter, $n_i$ as zero. Therefore, each inverter controls the output voltage magnitude $E_i$ based on the voltage reference from (19). The voltage reference is the sum of nominal reference E* and the information state $\Delta E_i^{syn*}$. The gains of distributed secondary frequency control and synchronization control, $k_i$ and $k_s$ are set as 2.0 and 0.2, respectively. The low-pass filter time-constant is 10.

For implementing the P–$\omega$ and Q–V droop laws, active and reactive power outputs of each inverter, $P_i$ and $Q_i$ need to be calculated locally using the instantaneous output voltage and current measurements, $v_i$ and $i_i$.

Figure 7A:
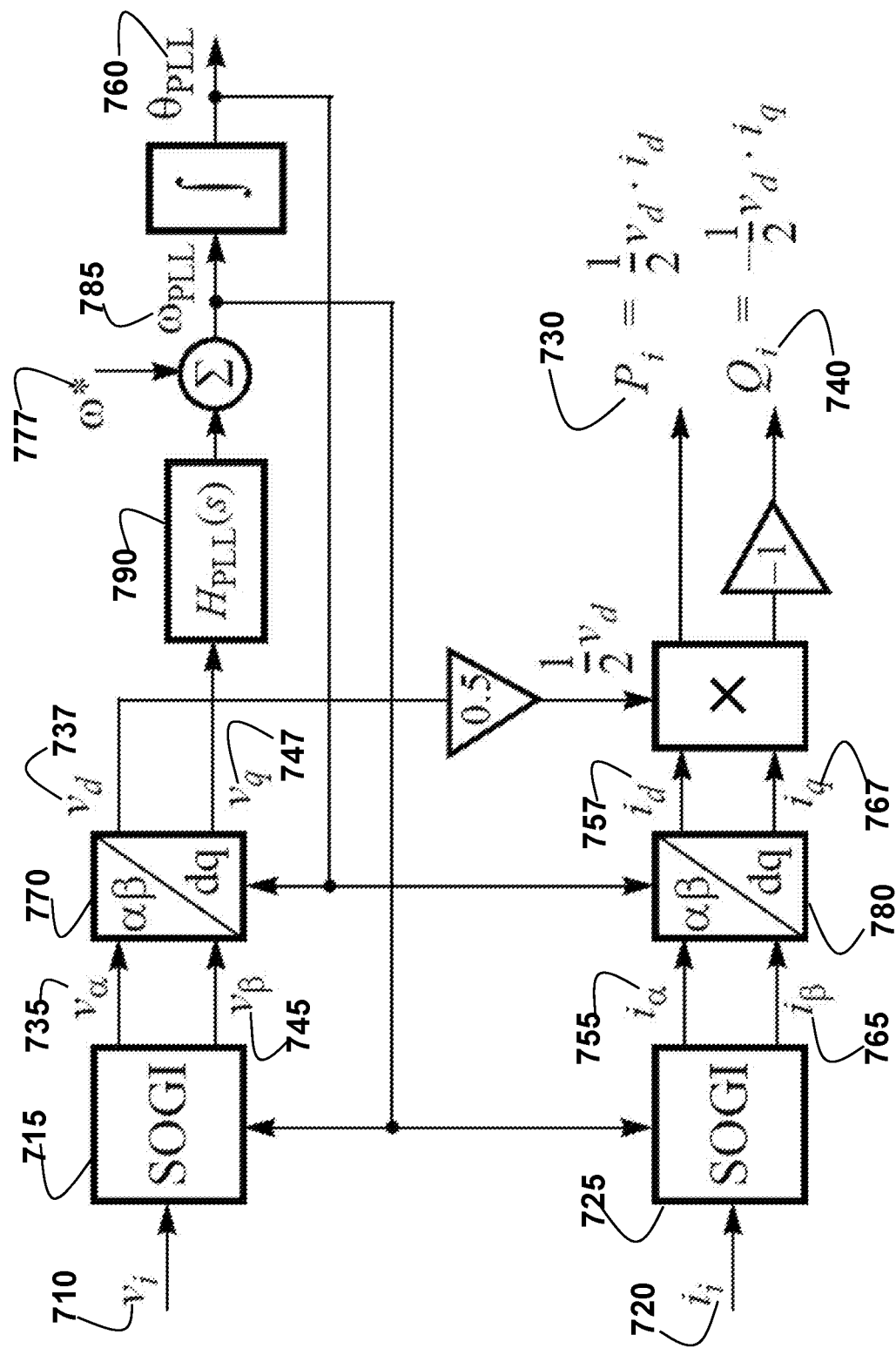
FIG. 7A is a schematic illustrating a calculation of active and reactive power output of a single-phase inverter from its output voltage and current measurements based on second order generalized integrator based phase locked loops (SOGI-PLLs), according to some embodiments of the present disclosure.

FIG. 7A is a schematic illustrating a calculation of active and reactive power output of a single-phase inverter from its instantaneous output voltage and current measurements, using second-order generalized integrator based phase-locked loops (SOGI-PLLs), according to some embodiments of the present disclosure. It first uses second-order generalized integrators to convert the voltage $v_i$ 710 and current $i_i$ 720 into corresponding voltages and currents in $\alpha\beta$ frame, $v_\alpha$ 735 and $v_\beta$ 745, $i_\alpha$ 755 and $i_\beta$ 765. Those signals that are orthogonal to the voltage and current measurements are then further converted into ones in dq frames, $v_d$ 737 and $v_q$ 747, and $i_d$ 757 and $i_q$ 767, based on $\alpha\beta$-dq transformations, 770 and 780. After that, the active and reactive powers of the inverter, 730 $P_i$ and 740 $Q_i$ can be calculated using voltage and currents in dq frames. Meanwhile, based on the voltage $v_q$ and nominal frequency, $\omega$*, a frequency 785 and a phase angle 760 of the inverter can be determined using a phase-locked loop based compensator block, 790. The bandwidth of the compensator 790, $H_{PLL}(s)$ is 0.5 Hz, and its transfer function is $(6.8+2.15/s) \cdot 10^{-3}$.

Figure 7B:
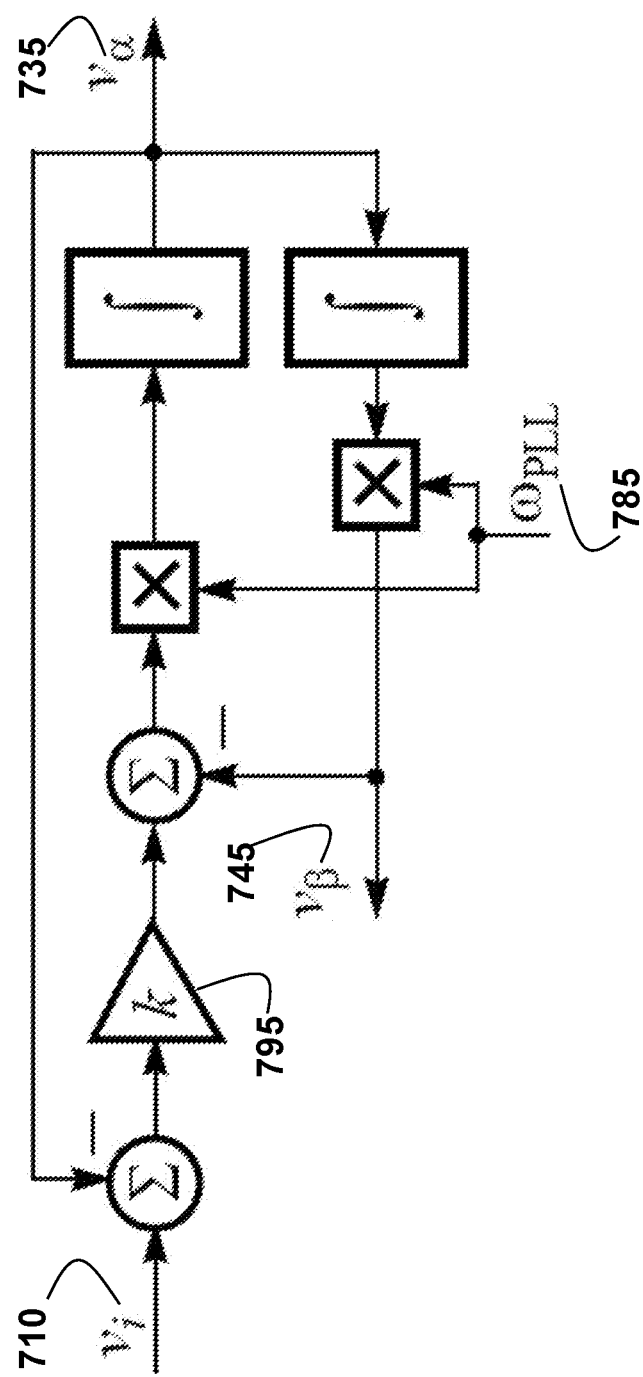
FIG. 7B is a schematic illustrating the second order generalized integrator (SOGI) block used in power calculations, according to some embodiments of the present disclosure.

FIG. 7B is a schematic illustrating the second-order generalized integrator (SOGI) block used in active and reactive power calculations, according to some embodiments of the present disclosure. The gain of SOGI block 795, k is set as 1.414.

A set of consecutive events are simulated to demonstrate the performance of the disclosed method with respect to synchronization at different point of common coupling, and operating microgrid at different modes. The simulated results are illustrated in FIGS. 8A-8F. The simulated events include synchronization at point of common couplings, PCC-1 between the inverter-1 and an external system, PCC-3 between the inverter-3 and an external system, PCC4 between the inverter-4 and an external system, and load changes at bus connected to inverter-4, 801, 802, 803 and 804.

Five different time moments are used to describe the schedule of event occurring, including $t_0$ 811 for the isolated operation of the microgrid, $t_1$ 812, $t_2$ 813, $t_3$ 814, and $t_4$ 815 for the occurring times of events 801, 802, 803, and 804.

At time $t_0$, the microgrid is operated at an isolated state where the distributed synchronization control is in the averaging mode. At time $t_1$, the distributed synchronization control is changed to the leader-follower mode with inverter-1 as the leader. Its information states $\Delta\omega_1^{syn}$ is reduced to $-2\pi \cdot 1$ rad/s to reduce the microgrid frequency to 59 Hz, and $\Delta E_1^{syn}$ is increased to $0.05 \cdot E*$ to increase the microgrid voltage by 5% above the nominal voltage E*. At time $t_2$, inverter-3 is made the leader. Its frequency correction state $\Delta\omega_3^{syn}$ is kept equal $-2\pi \cdot 1$ and the voltage correction state $\Delta E_3^{syn}$ is reduced to $-0.05 \cdot E*$ to reduce the microgrid voltage by 5% below the nominal voltage E*. At time $t_3$, inverter-4 is made the leader. Its frequency correction state $\Delta\omega_4^{syn}$ is increase to $2\pi \cdot 1$ to increase the microgrid frequency to 61 Hz and the voltage correction state $\Delta E_4^{syn}$ is made equal to $-0.02 \cdot E*$ to decrease the microgrid voltage to 2% below the nominal voltage E*. At last, at time $t_4$, load $R_{L2}$ is doubled from 2 kW to 4 kW.

Figure 8A:
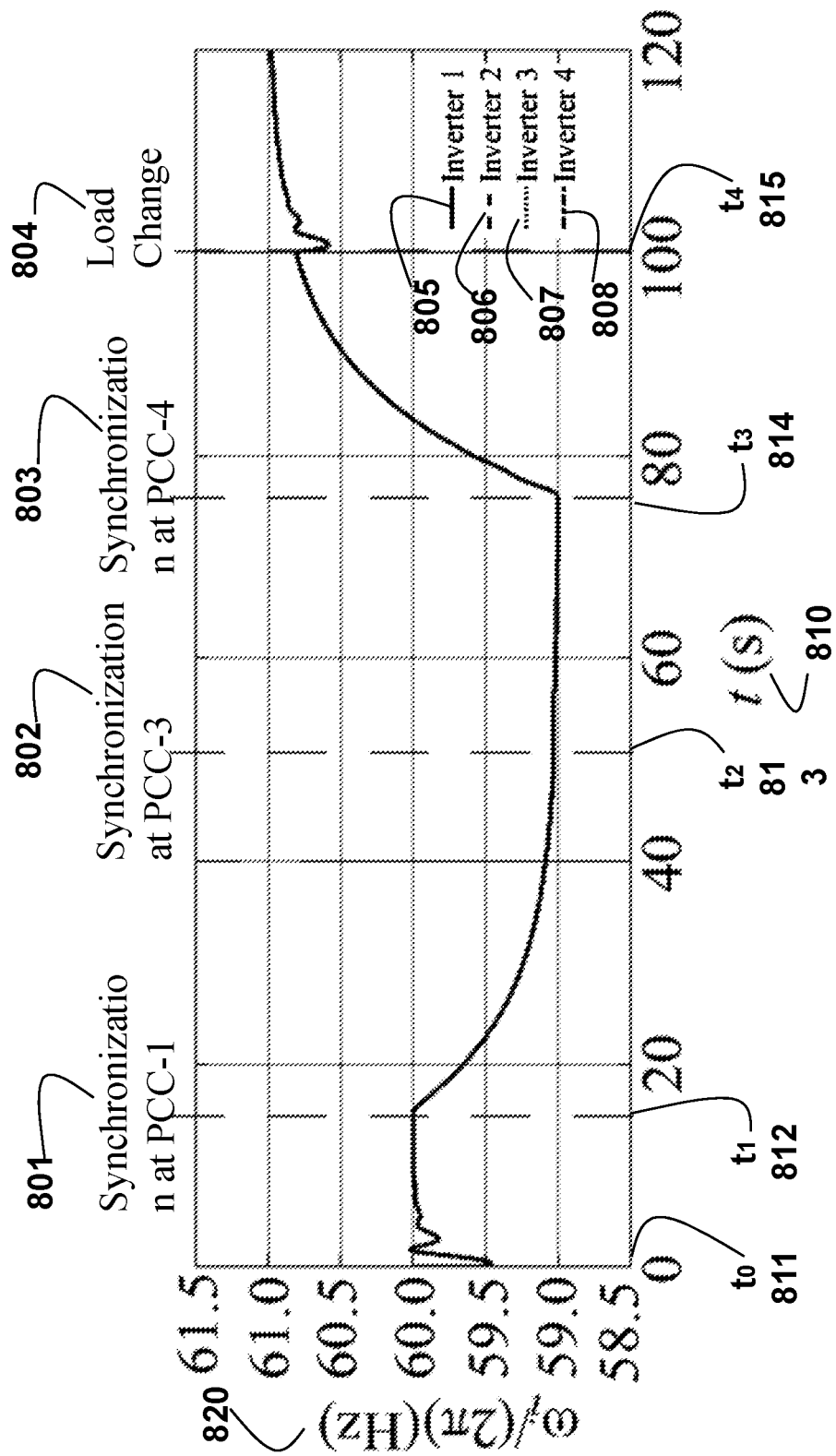
FIG. 8A is an exemplar graphic plot illustrating performance of inverter output frequencies of distributed synchronization control, according to some embodiments of the present disclosure.

FIG. 8A is an exemplar graphic plot illustrating performance of inverter output frequencies, $\omega_i/2\pi$ of distributed synchronization control, according to some embodiments of the present disclosure. The x-axis of the plot represents the event occurring time, 810, and y-axis of the plot represents the inverter frequencies 820. In FIGS. 8A-8F, the solid lines, 805 represent parameters of inverter-1, the dashed lines, 806 represent parameters of inverter-2, the dotted lines, 807 represent parameters of inverter-3, and dashed-dotted lines, 808 represent parameters of inverter-4.

Figure 8B:
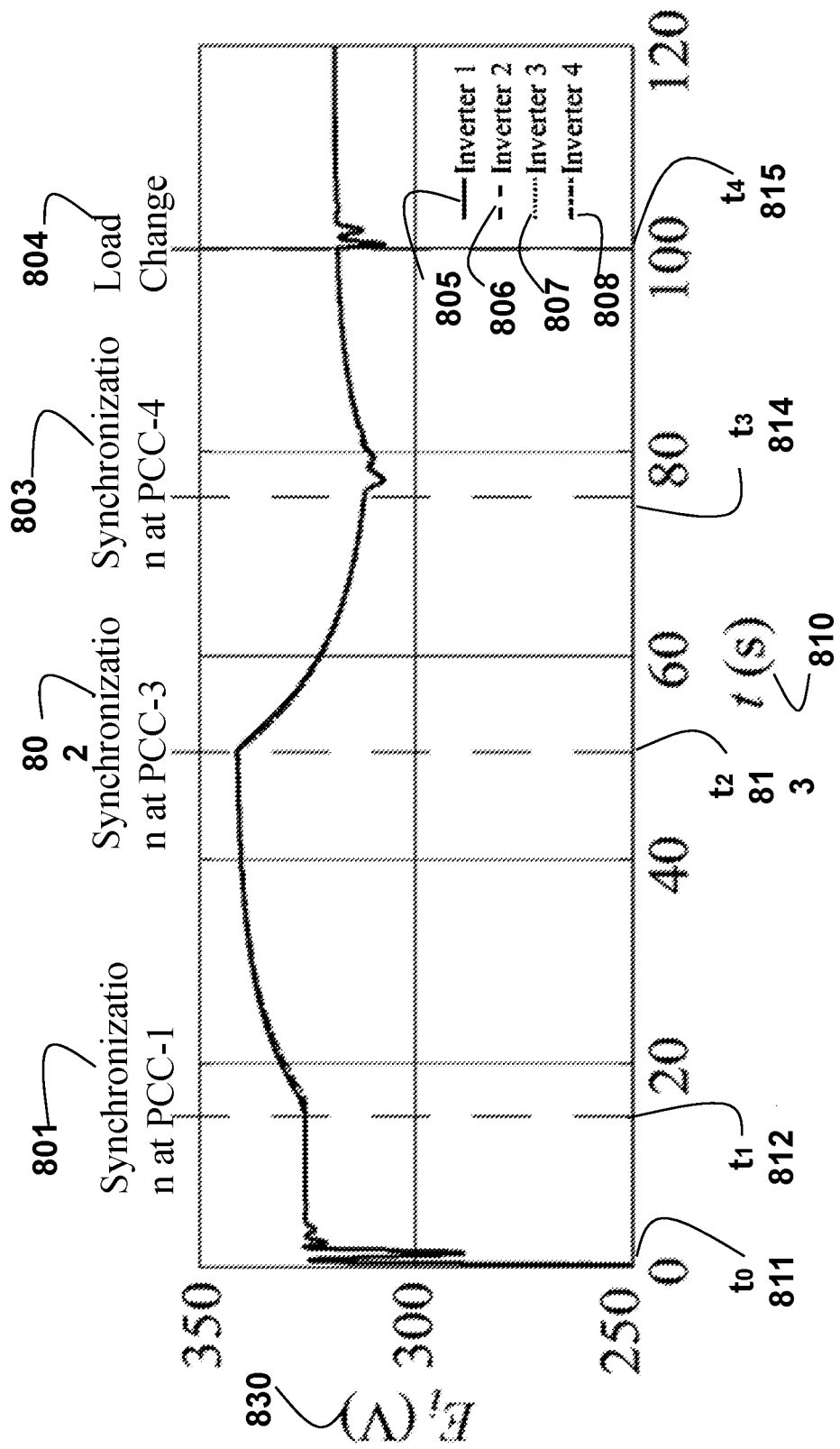
FIG. 8B is an exemplar graphic plot illustrating performance of inverter output voltages of distributed synchronization control, according to some embodiments of the present disclosure.

FIG. 8B is an exemplar graphic plot illustrating performance of inverter output voltages, $E_i$ of distributed synchronization control, according to some embodiments of the present disclosure. The y-axis of the plot represents the inverter output voltages 830.

Figure 8C:
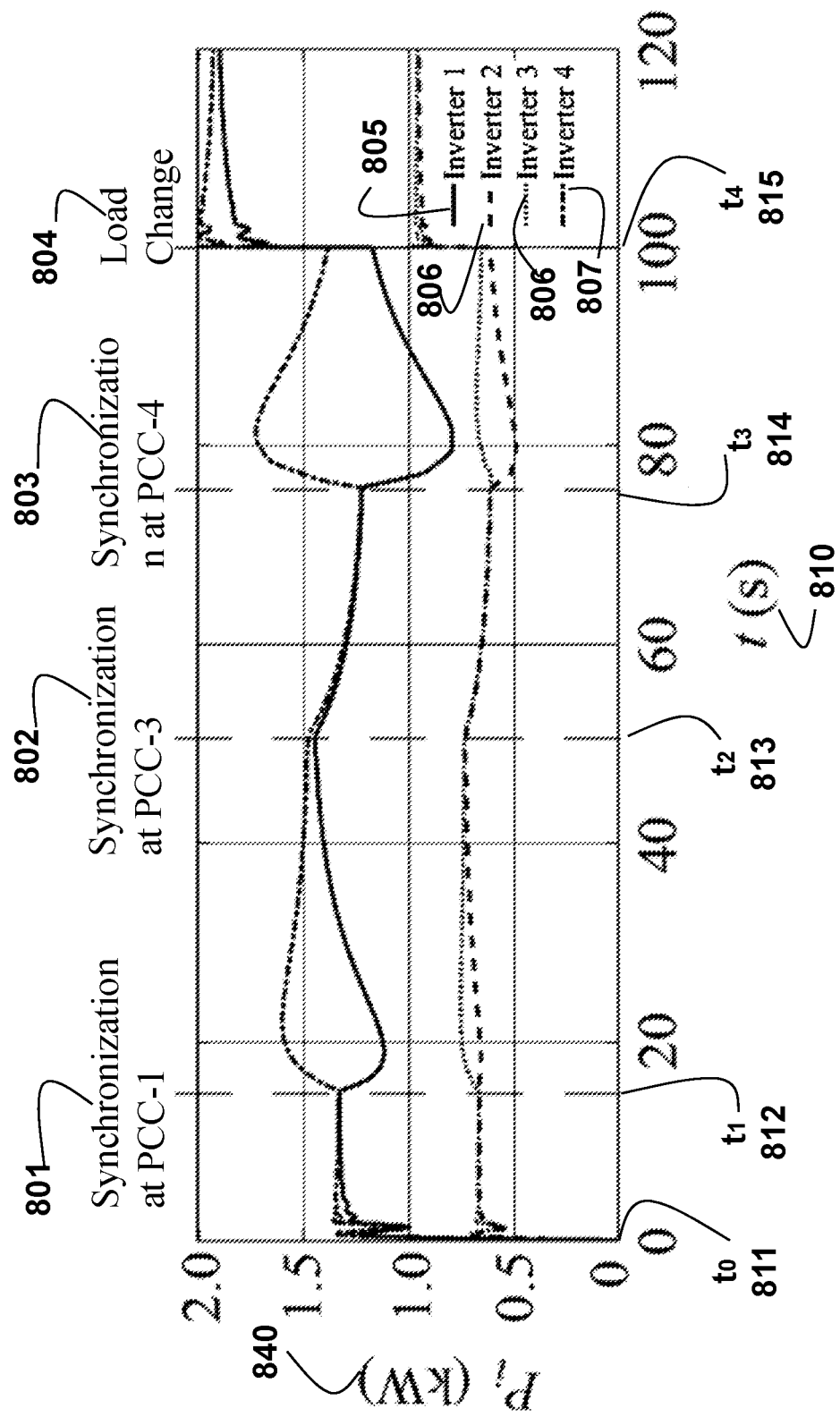
FIG. 8C is an exemplar graphic plot illustrating performance of inverter active power outputs of distributed synchronization control, according to some embodiments of the present disclosure.

FIG. 8C is an exemplar graphic plot illustrating performance of inverter active power outputs, $P_i$ of distributed synchronization control, according to some embodiments of the present disclosure. The y-axis of the plot represents the inverter active output powers 840.

Figure 8D:
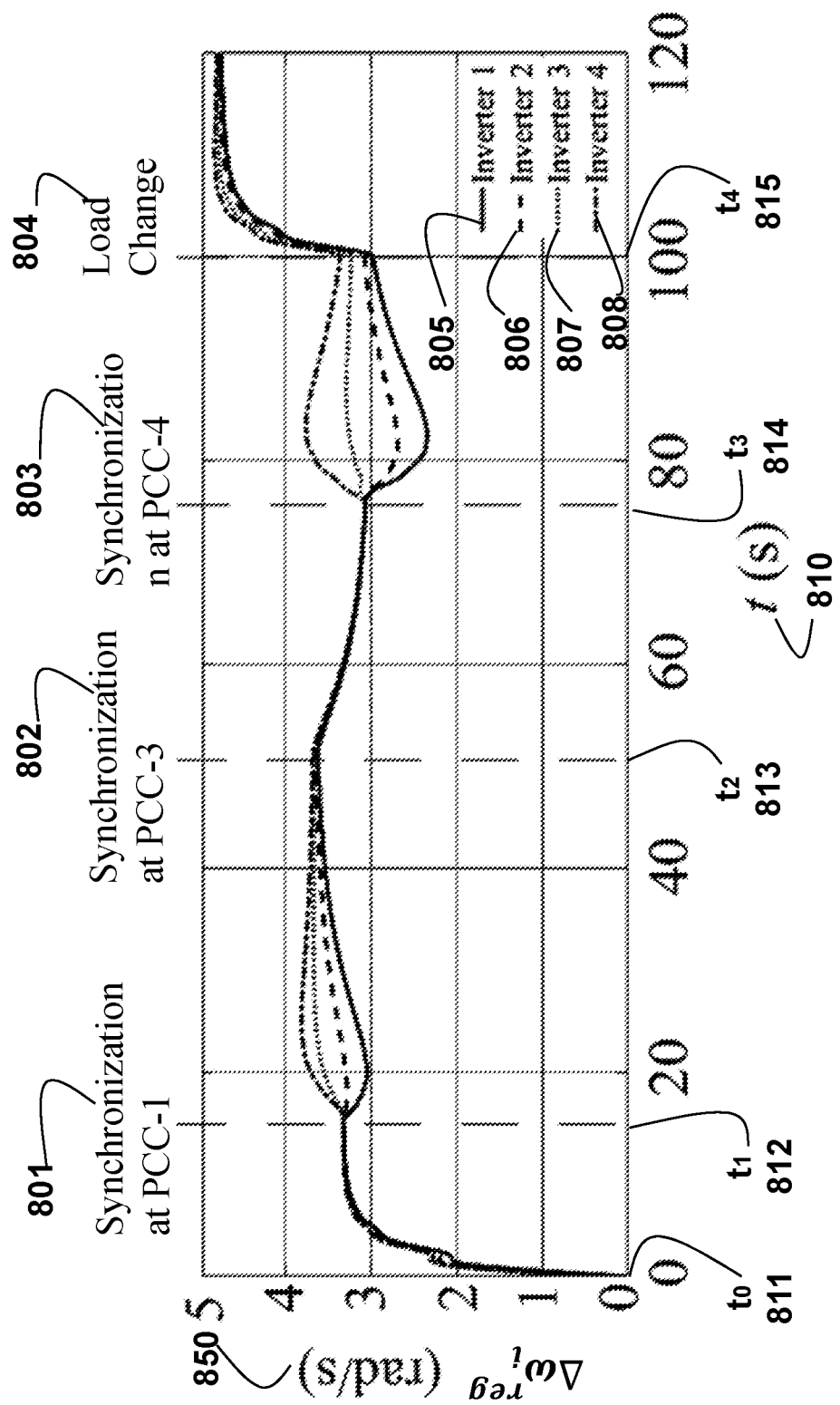
FIG. 8D is an exemplar graphic plot illustrating the first information state, frequency regulation offset output, according to some embodiments of the present disclosure.

FIG. 8D is an exemplar graphic plot illustrating the first information state, frequency regulation offset output $\Delta\omega_i^{reg}$ according to some embodiments of the present disclosure. The y-axis of the plot represents the secondary frequency offsets, 850.

Figure 8E:
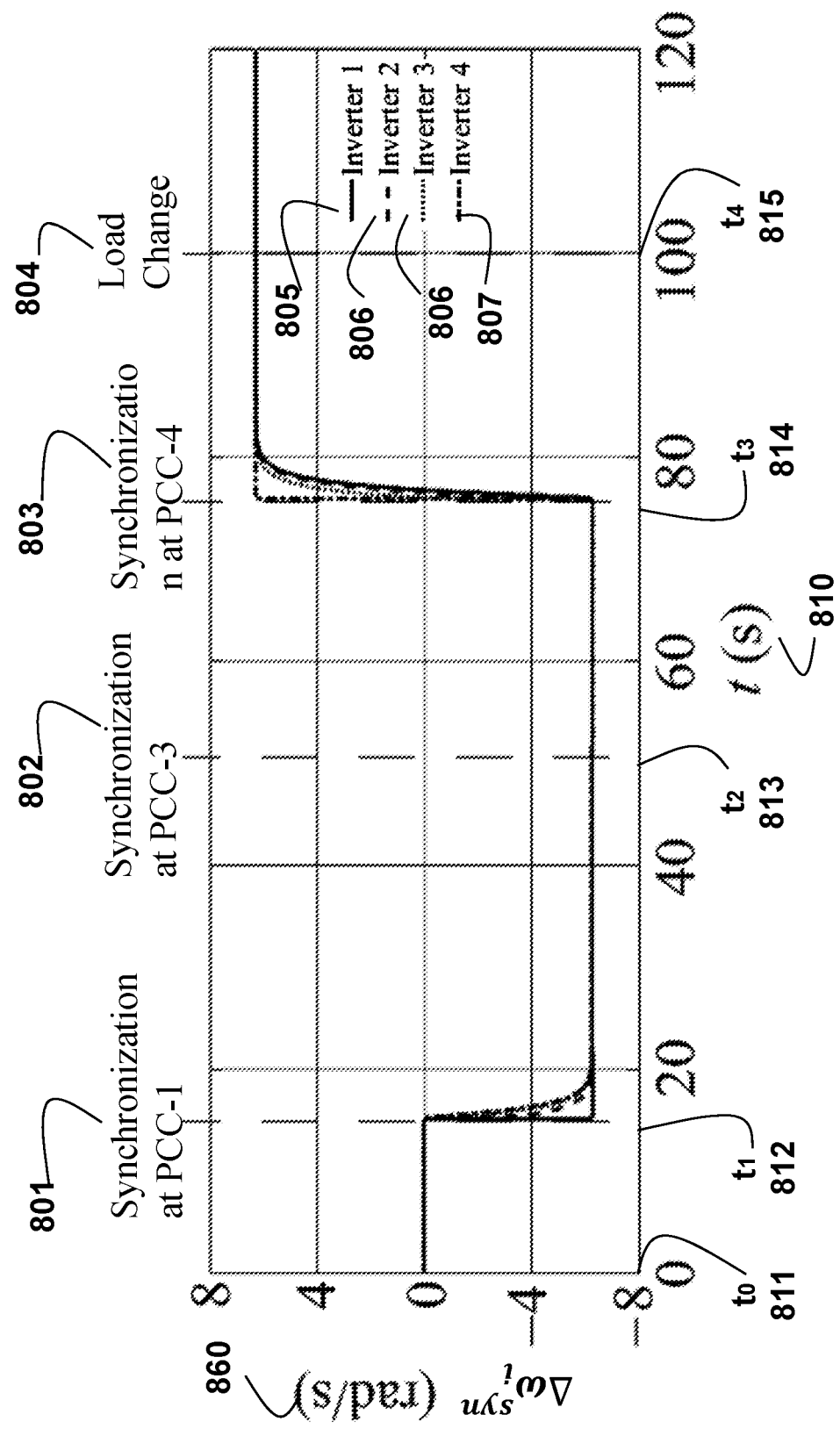
FIG. 8E is an exemplar graphic plot illustrating the second information state, frequency synchronization correction output, according to some embodiments of the present disclosure.

FIG. 8E is an exemplar graphic plot illustrating the second information state, frequency synchronization correction output $\Delta\omega_i^{syn}$, according to some embodiments of the present disclosure. The y-axis of the plot represents the frequency synchronization corrections, 860.

Figure 8F:
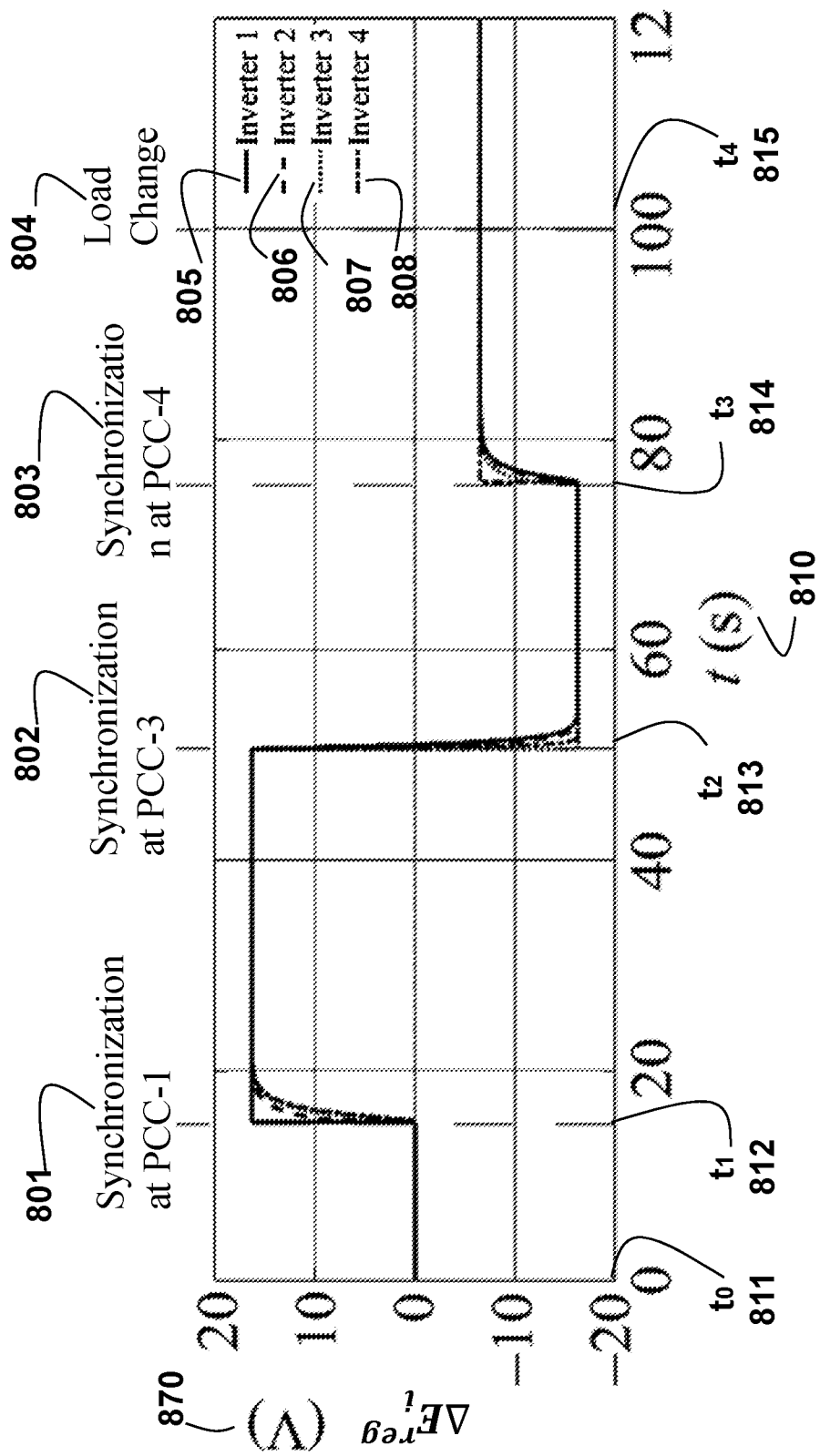
FIG. 8F is an exemplar graphic plot illustrating the third information state, voltage synchronization correction output, according to some embodiments of the present disclosure.

FIG. 8F is an exemplar graphic plot illustrating the third information state, voltage synchronization correction output $\Delta E_i^{syn}$, according to some embodiments of the present disclosure. The y-axis of the plot represents the voltage synchronization corrections, 870.

As shown in FIG. 8D, the frequency synchronization correction information states, $\Delta\omega_i^{syn}$ start increasing to restore the microgrid frequency to 60 Hz after the simulation is started at $t_0$. The total load on the microgrid is 4 kW, which is shared by the four inverters depending on the P–$\omega$ droop slopes, $m_i$. Active power supplied by inverters 1 and 4 is double than that supplied by inverters 2 and 3 because the droop slopes, $m_1$ and $m_4$ are half than the droop slopes, $m_2$ and $m_3$. The distributed synchronization states continue to stay at a common value because of the averaging mode.

Inverter-1 is assigned as the leader at time $t_1$, and the distributed synchronization control is changed from the averaging mode to the leader-follower mode. The synchronization correction information states of the remaining inverters start approaching that of the inverter-1, as seen in FIG. 8E and FIG. 8F. Since, the follower inverters take some time before converging their synchronization information states to that of the inverter-1, there will be a transient power mismatch among the inverters, as seen in FIG. 8C. The transient power mismatch is kept low by applying a low-pas filter to the synchronization information states $\Delta\omega_i^{syn}$ and $\Delta E_i^{syn}$ before using them in the primary and secondary control of the inverters. Depending on the synchronization information states set by the leader inverter-1, the microgrid frequency and voltage settle respectively to 59 Hz and 1.05·E*. Distributed synchronization is switched back to the averaging mode at around 30 s. The transition from the leader-follower mode to the averaging mode does not change the microgrid frequency or voltage, because the synchronization information states are already at consensus with each other. Hence no transient is observed at 30 s.

At $t_2$, the inverter-3 is made the leader. Since the inverter-3 does not demand change in the microgrid frequency, there is no disturbance in the active power sharing among the inverters at $t_2$. The microgrid voltage settles to a new value 0.95·E* depending on $\Delta E_3^{syn}$ set by the inverter-3.

At $t_3$, the inverter-4 is made the leader and it is evident from FIGS. 8A-8F that the microgrid frequency and voltage converge to values demanded by the leader, inverter-4.

At $t_4$, load $R_{L2}$ is increased from 2 kW to 4 kW, making the total load on the microgrid to be 6 kW. It is to be noted that the synchronization states in FIG. 8E and FIG. 8F remain unchanged as the load transients are unrelated to the distributed synchronization dynamics. On the other hand, the distributed secondary control information states, $\Delta\omega_i^{reg}$ start increasing to compensate for the increment in the total microgrid load and restore the frequency back to the value demanded by the leader inverter.

Features

Aspects of the present disclosure include each distributed generator of the microgrid includes a primary controller, a secondary controller and a synchronization controller, wherein the synchronization controller that initially communicates with neighboring generators within the microgrid with sparse communication channels, to identify adjacent power grids to be interconnected. Wherein an aspect includes the received synchronization parameters that include a voltage frequency, a voltage phase angle and a voltage magnitude. An aspect includes connecting the first adjacent power grid with the micro grid is based on when a difference of synchronization parameters between both sides of the point of interconnection between the first adjacent power grid and the micro grid are less than the set of predetermined synchronization parameters thresholds. Wherein receiving a user input on a surface of at least one user input interface in communication with the synchronization controllers of the microgrid provides the set of predetermined synchronization parameters thresholds.

Another aspect includes the leader distributed generator only sending information to neighboring distributed generators in the micro grid after receiving a request to connect to the microgrid from an identified adjacent power grid, so that the leader distributed generator receives information from the identified adjacent power grid. wherein the follower distributed generators send and receive information with neighboring distributed generators.

Another aspect includes the adjusting of the active outputs of a follower distributed generator and the leader distributed generator are based on a droop control law, in which, each distributed generator frequency is set as a sum of a nominal frequency $\omega_i^*$ of the distributed generator, and a filtered frequency correction $\Delta\omega_i^{syn*}$ of the distributed generator, and a frequency regulation offset $\Delta\omega_i^{reg}$ of the distributed generator minus a product of the distributed generator droop constant $m_i$ and an active output $P_i$ of the distributed generator, $\omega_i=(\omega_i^*+\Delta\omega_i^{syn*})-m_i\cdot P_i+\Delta\omega_i^{reg}$.

Figure 9:
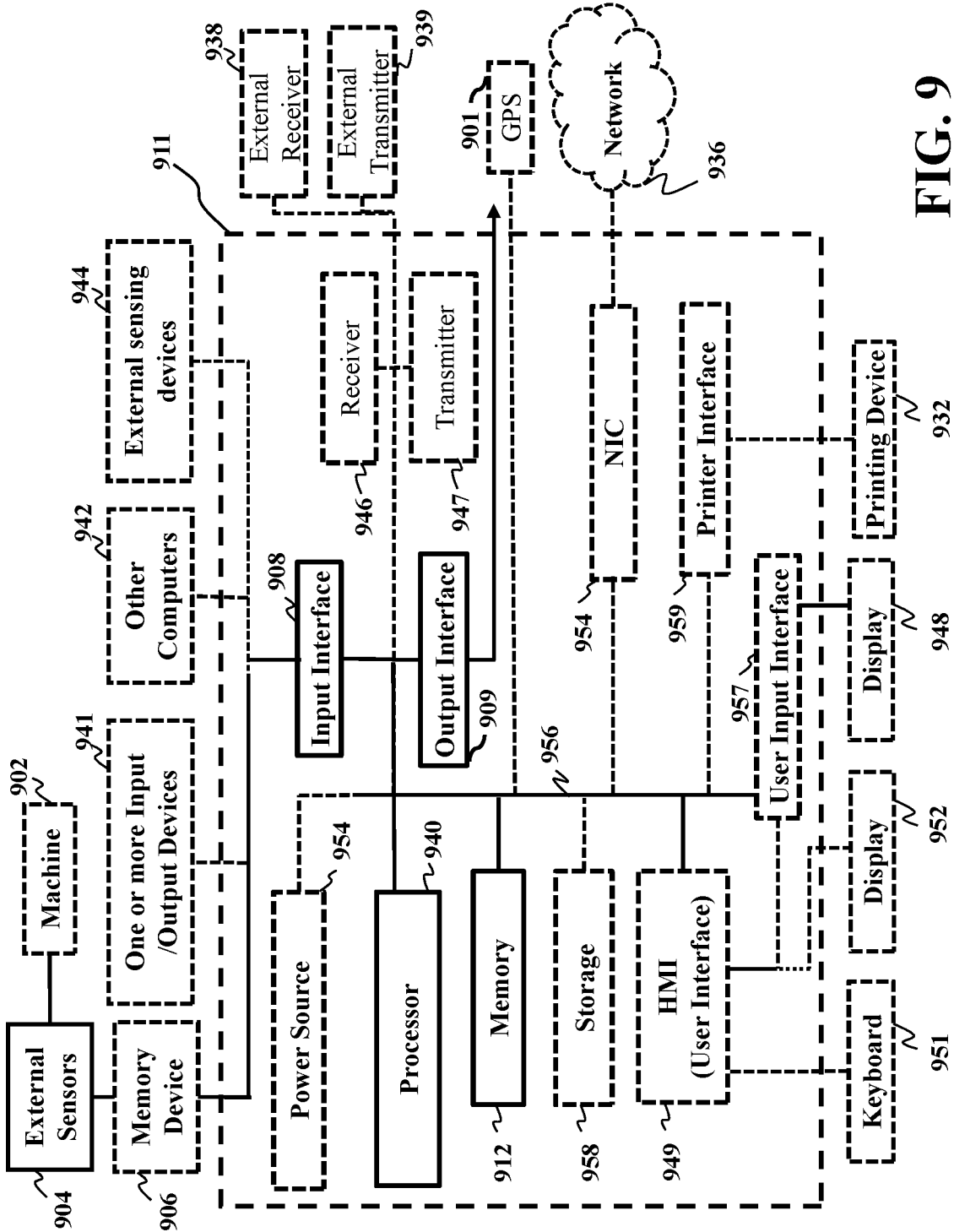
FIG. 9 is a block diagram of illustrating the method of FIG. 1A, that can be implemented using an alternate synchronization controller, according to embodiments of the present disclosure.

FIG. 9 is a block diagram of illustrating the method of FIG. 1A, that can be implemented using an alternate synchronization controller, according to embodiments of the present disclosure. The controller 911 includes a processor 940, computer readable memory 912, storage 958 and user interface 949 with display 952 and keyboard 951, which are connected through bus 956. For example, the user interface 949 in communication with the processor 940 and the computer readable memory 912, acquires and stores the data in the computer readable memory 912 upon receiving an input from a surface, keyboard surface, of the user interface 957 by a user.

Contemplated is that the memory 912 can store instructions that are executable by the processor, historical data, and any data to that can be utilized by the methods and systems of the present disclosure. The processor 940 can be a single core processor, a multi-core processor, a computing cluster, or any number of other configurations. The processor 940 can be connected through a bus 956 to one or more input and output devices. The memory 912 can include random access memory (RAM), read only memory (ROM), flash memory, or any other suitable memory systems.

Still referring to FIG. 9, a storage device 958 can be adapted to store supplementary data and/or software modules used by the processor. For example, the storage device 958 can store historical data and other related data as mentioned above regarding the present disclosure. Additionally, or alternatively, the storage device 958 can store historical data similar to data as mentioned above regarding the present disclosure. The storage device 958 can include a hard drive, an optical drive, a thumb-drive, an array of drives, or any combinations thereof.

The system can be linked through the bus 956 optionally to a display interface (not shown) adapted to connect the system to a display device (not shown), wherein the display device can include a computer monitor, camera, television, projector, or mobile device, among others.

The controller 911 can include a power source 954, depending upon the application the power source 954 may be optionally located outside of the controller 911. Linked through bus 956 can be a user input interface 957 adapted to connect to a display device 948, wherein the display device 948 can include a computer monitor, camera, television, projector, or mobile device, among others. A printer interface 959 can also be connected through bus 956 and adapted to connect to a printing device 932, wherein the printing device 932 can include a liquid inkjet printer, solid ink printer, large-scale commercial printer, thermal printer, UV printer, or dye-sublimation printer, among others. A network interface controller (NIC) 954 is adapted to connect through the bus 956 to a network 936, wherein data or other data, among other things, can be rendered on a third party display device, third party imaging device, and/or third party printing device outside of the controller 911. Further, the bus 956 can be connected to a Global Positioning System (GPS) device 901 or a similar related type device.

Still referring to FIG. 9, the data or other data, among other things, can be transmitted over a communication channel of the network 936, and/or stored within the storage system 958 for storage and/or further processing. Further, the data or other data may be received wirelessly or hard wired from a receiver 946 (or external receiver 938) or transmitted via a transmitter 947 (or external transmitter 939) wirelessly or hard wired, the receiver 946 and transmitter 947 are both connected through the bus 956. The controller 911 may be connected via an input interface 908 to external sensing devices 944 and external input/output devices 941. The controller 911 may be connected to other external computers 942, memory device 906 and external sensors 904. An output interface 909 may be used to output the processed data from the processor 940.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A distributed synchronization method for interconnecting a microgrid with adjacent power grids at multiple points of interconnections, wherein each distributed generator of the microgrid includes a synchronization controller along with a primary controller and a secondary controller, wherein a sparse communication network is used to enable the distributed generator exchanging information with each of its neighboring distributed generators within the microgrid through bi-directional communication links, and the distributed generators located at points of interconnections also receive information from the adjacent power grids that connect to the same points of interconnections comprising the steps of:

receiving a request to connect to the microgrid from a first identified adjacent power grid in time, wherein the synchronization controllers of the microgrid assigns the distributed generator connecting to the point of interconnection between the microgrid and the first adjacent power grid as a leader distributed generator and only allows the leader distributed generator sending information to each of its neighboring distributed generators, and all remaining distributed generators are assigned as follower distributed generators within the microgrid;

determining a frequency synchronization correction and a voltage synchronization correction by the synchronization controller of the leader distributed generator, based on synchronization parameters received from the first adjacent power grid and nominal frequency and voltage for the leader distributed generator, and achieving consensus on frequency and voltage corrections for synchronization among all distributed generators of the microgrid;

adjusting active and reactive outputs of the follower distributed generators and the leader distributed generator, by modifying frequency and voltage references for each distributed generator in the microgrid with the determined frequency synchronization correction and voltage synchronization correction after passing through low-pass filters;

connecting the first adjacent power grid with the microgrid based on when a set of first predetermined synchronization parameter thresholds are satisfied;

reassigning the leader distributed generator as a follower distributed generator and re-enabling its bi-way communications with each of its neighboring distributed generators after connecting the first adjacent power grid with the microgrid; and iterating synchronizing of each remaining identified adjacent power grid with the above steps, based on a received request to connect to the microgrid from an identified adjacent power grid.

2. The distributed synchronization method of claim 1, wherein each distributed generator of the microgrid includes a primary controller, a secondary controller and a synchronization controller, wherein the synchronization controller that initially communicates with neighboring generators within the microgrid with sparse communication channels, such that an adjacent power grid is identified as the adjacent power grid to be interconnected if the synchronization controller of the distributed generator located at the point of interconnection between the microgrid and the adjacent power grid received a request for interconnection.

3. The distributed synchronization method of claim 1, wherein the received synchronization parameters include a voltage frequency, a voltage phase angle and a voltage magnitude.

4. The distributed synchronization method of claim 1, wherein connecting the first adjacent power grid with the microgrid is based on when a difference of synchronization parameters between both sides of the point of interconnection between the first adjacent power grid and the microgrid are less than the set of predetermined synchronization parameters thresholds.

5. The distributed synchronization method of claim 1, further comprising: receiving a user input on a surface of at least one user input interface in communication with the synchronization controllers of the microgrid the set of predetermined synchronization parameters thresholds.

6. The distributed synchronization method of claim 1, wherein the leader distributed generator only accepts information from the first identified adjacent power grid, and only sends information to each of its neighboring distributed generators in the microgrid after receiving a request to connect to the microgrid from the first identified adjacent power grid.

7. The distributed synchronization method of claim 6, wherein the follower distributed generators send and receive information with each of its neighboring distributed generators.

8. The distributed synchronization method of claim 1, wherein the adjusting of the active outputs of a follower distributed generator and the leader distributed generator are based on a droop control law, in which, each distributed generator frequency $\omega_i$ is set as a sum of a nominal frequency $\omega_i^*$ of the distributed generator, and a filtered frequency synchronization correction $\Delta\omega_i^{syn}$ of the distributed generator, and a frequency regulation offset $\Delta\omega_i^{reg}$ of the distributed generator minus a product of the distributed generator droop constant $m_i$ and an active output $P_i$ of the distributed generator, $m_i \cdot P_i$, $$\omega_i = (\omega_i + \Delta\omega_i^{syn*}) - m_i \cdot P_i + \Delta\omega_i^{reg}.$$

9. The distributed synchronization method of claim 8, wherein the frequency regulation offset, $\Delta\omega_i^{reg}$ for the distributed generator is updated following consensus control law, that is, its derivative with time $\frac{d\Delta\omega_i^{reg}}{dt}$ is equal to a difference between a sum of its nominal value and filtered frequency synchronization correction, $(\omega_i^* + \Delta\omega_i^{syn^*})$ and a current frequency $\omega_i$, minus a sum of frequency regulation offset differences between this generator i and other generators j that it has direct communication link with, $\Delta\omega_i^{reg} - \Delta\omega_j^{reg}$:

$$\frac{d\Delta\omega_i^{reg}}{dt} = -[\omega_i - (\omega_i^* + \Delta\omega_i^{syn^*})] - \sum_{j=1}^{n} a_{ij}(\Delta\omega_i^{reg} - \Delta\omega_j^{reg})$$

where n is a total number of distributed generators in the communication network, $a_{ij}$ is a binary number defined by an availability of a direct communication link between generator i and generator j, and set as 1 if, a direct communication exists, otherwise set as zero.

10. The distributed synchronization method of claim 9, wherein the filtered frequency synchronization correction for the distributed generator is generated by passing a frequency synchronization correction, $\Delta\omega_i^{syn}$ through a low-pass filter defined with a time constant $T_{fil}^{\omega}$, that is, the derivative of filtered frequency synchronization correction with time, $$\frac{d\Delta\omega_i^{syn^*}}{dt}$$

is set as the difference between the original correction and the filtered correction divided by the filter's time constant:

$$\frac{d\Delta\omega_i^{syn^*}}{dt} = \frac{1}{T_{fil}^{\omega}}(\Delta\omega_i^{syn} - \Delta\omega_i^{syn^*}).$$

11. The distributed synchronization method of claim 10, wherein the frequency synchronization correction for the distributed generator is updated following consensus control law, that is, the derivative of frequency synchronization correction with time $$\frac{d\Delta\omega_i^{syn}}{dt}$$

is equal to negative of the sum of frequency synchronization correction differences between this generator i and other generators j that it has direct communication with $\Delta\omega_i^{syn} - \Delta\omega_j^{syn}$, divided by a time constant $k_s^{\omega}$:

$$k_s^{\omega}\frac{d\Delta\omega_i^{syn}}{dt} = -\sum_{j=1}^{n} a_{ij}(\Delta\omega_i^{syn} - \Delta\omega_j^{syn}).$$

12. The distributed synchronization method of claim 10, wherein the frequency synchronization correction of leader generator k is defined as the difference between the frequency of the first identified adjacent power grid to be connected measuring at the point of interconnection, $\omega_k^{PCC}$ and the nominal frequency of distributed generator k, $\omega_k^*$, when the frequency difference is bigger than a second pre-determined threshold:

$$\Delta\omega_k^{syn} = \omega_k^{PCC} - \omega_k^*$$

13. The distributed synchronization method of claim 10, wherein the frequency synchronization correction of leader generator k is defined as the difference between the derivative of phase angle of the first identified power grid to be connected measuring at the point of interconnection with time, $$\frac{d\theta_k^{PCC}}{dt}$$

and the nominal frequency of generator k, $\omega_k'$ when the frequency difference between two sides of point of interconnection is less than a second pre-determined threshold:

$$\Delta\omega_k^{syn} = \frac{d\theta_k^{PCC}}{dt} - \omega_k^*.$$

14. The distributed synchronization method of claim 1, wherein the adjusting of the reactive outputs of a follower distributed generator and the leader distributed generator are based on a droop control law, in which, each distributed generator voltage is set as a sum of a nominal voltage $E_i^*$ of the distributed generator, a voltage regulation offset $\Delta E_i^{reg}$, and a filtered voltage synchronization correction $\Delta E_i^{syn^*}$ of the distributed generator minus a product of a droop constant $n_i$ of the distributed generator and a reactive output $Q_i$ of the distributed generator, $n_i \cdot Q_i$, $$E_i = E_i^* - n_i \cdot Q_i + \Delta E_i^{reg} + \Delta E_i^{syn^*}.$$

15. The distributed synchronization method of claim 14, wherein the filtered voltage synchronization correction for the distributed generator, $\Delta E_i^{syn^*}$ is generated by passing a voltage synchronization correction $\Delta E_i^{syn}$ through a low-pass filter defined with a time constant $T_{fil}^{E}$, that is, the derivative of the filtered voltage synchronization correction with time, $$\frac{d\Delta E_i^{syn^*}}{dt}$$

is set as the difference between the original correction and the filtered correction divided by the filter's time constant, $T_{fil}^{E}$:

$$\frac{d\Delta E_i^{syn^*}}{dt} = \frac{1}{T_{fil}^{E}}(\Delta E_i^{syn} - \Delta E_i^{syn^*}).$$

16. The distributed synchronization method of claim 15, wherein, the voltage synchronization correction for the distributed generator, $\Delta E_i^{syn}$ is updated following consensus control law, that is, the derivative of voltage synchronization correction with time, $$\frac{d\Delta E_i^{syn}}{dt}$$

is equal to negative of the sum of voltage synchronization correction differences between this generator i and other generators j that it has direct communication with, $\Delta E_i^{syn} - \Delta E_j^{syn}$, divided by a time constant $k_s^E$:

$$k_s^E \frac{d\Delta E_i^{syn}}{dt} = -\sum_{j=1}^{n} a_{ij}(\Delta E_i^{syn} - \Delta E_j^{syn})$$

where n is the total number of distributed generators in the communication network, $a_{ij}$ is the binary number defined by the availability of direct communication between generator i and generator j, and set as 1 if direct communication exists, otherwise set as zero.

17. The distributed synchronization method of claim 16, wherein the voltage synchronization correction of leader generator k, $\Delta E_k^{syn}$ is defined as the difference between the voltage of the first identified power grid to be connected measuring at the point of interconnection, $E_k^{PCC}$ and the nominal voltage of generator k, $E_k^*$:

$$\Delta E_k^{syn} = E_k^{PCC} - E_k^*.$$

18. A distributed synchronization method for interconnecting a microgrid with adjacent electric power grids at multiple points of interconnections, wherein each distributed generator of the microgrid includes a primary controller, a secondary controller and a synchronization controller along with a primary controller and a secondary controller, wherein a sparse communication network is used to enable the distributed generator exchanging information with each of its neighboring distributed generators within the microgrid through bi-directional communication links, and the distributed generators located at points of interconnections also receive information from the adjacent power grids that connect to the same points of interconnections, comprising the steps of:

receiving a request to connect to the microgrid from a first identified adjacent power grid in time, wherein the synchronization controllers of the microgrid assigns the distributed generator connecting to the point of interconnection between the microgrid and the first adjacent power grid as a leader distributed generator and only allows the leader distributed generator sending information to each of its neighboring distributed generators, and all remaining distributed generators are assigned as follower distributed generators within the microgrid, wherein the leader distributed generator only accepts information from the first identified adjacent power grid;

determining a frequency synchronization correction and a voltage synchronization correction by the synchronization controller of the leader distributed generator, based on synchronization parameters received from the first adjacent power grid and nominal frequency and voltage for the leader distributed generator, and achieving consensus on frequency and voltage corrections for synchronization among all distributed generators of the microgrid;

adjusting active and reactive outputs of the follower distributed generators and the leader distributed generator, by modifying frequency and voltage references for each distributed generator in the microgrid with the determined frequency synchronization correction and voltage synchronization correction after passing through low-pass filters;

connecting the first adjacent power grid with the microgrid based on when a set of first predetermined synchronization parameter thresholds are satisfied, wherein the set of the first predetermined synchronization parameters thresholds are received from a user of a user input interface in communication with the synchronization controllers of the microgrid;

reassigning the leader distributed generator as a follower distributed generator and re-enabling its bi-way communications with each of its neighboring distributed generators after connecting the first adjacent power grid with the microgrid; and iterating synchronizing of each remaining identified adjacent power grid with the above steps, based on a received request to connect to the microgrid from an identified adjacent power grid.

19. The distributed synchronization method of claim 18, wherein the adjusting of the active outputs of a follower distributed generator and the leader distributed generator are based on a droop control law, in which, each distributed generator frequency is set as a sum of a nominal frequency $\omega_i^*$ of the distributed generator, and a filtered frequency correction $\Delta \omega_i^{sYn*}$ of the distributed generator, and a frequency regulation offset $\Delta \omega_i^{reg}$ of the distributed generator minus a product of the distributed generator droop constant $m_i$ and an active output $P_i$ of the distributed generator, $m_i \cdot P_i$, $$\omega_i = (\omega_i^* + \Delta \omega_i^{syn*}) - m_i \cdot P_i + \Delta \omega_i^{reg}.$$

20. A distributed synchronization system for interconnecting a microgrid with adjacent power grids at multiple points of interconnections, wherein each distributed generator of the microgrid includes a synchronization controller along with a primary controller and a secondary controller, wherein a sparse communication network is used to enable the distributed generator exchanging information with each of its neighboring distributed generators within the microgrid through bi-directional communication links, and the distributed generators located at points of interconnections also receive information from the adjacent power grids that connect to the same points of interconnections, comprising:

a user input interface, such that a user of the user input interface is in communication with the synchronization controllers of the microgrid, and provides a set of first predetermined synchronization parameter thresholds; a first identified adjacent power grid sends a request to connect to the microgrid which is received according in time, wherein the synchronization controllers of the microgrid assigns the distributed generator connecting to the point of interconnection between the microgrid and the first adjacent power grid as a leader distributed generator and only allows the leader distributed generator sending information to each of its neighboring distributed generators, and all remaining distributed generators are assigned as follower distributed generators within the microgrid, wherein the synchronization controller of the leader distributed generator is configured to determine a frequency synchronization correction and a voltage synchronization correction, based on synchronization parameters received from the first adjacent power grid and nominal frequency and voltage for the leader distributed generator, and achieving consensus on frequency and voltage corrections for synchronization among all distributed generators of the microgrid;

adjust active and reactive outputs of the follower distributed generators and the leader distributed generator, by modifying frequency and voltage references for each distributed generator in the microgrid with the determined frequency synchronization correction and voltage synchronization correction after passing through low-pass filters;

connect the first adjacent power grid with the microgrid based on when the set of first predetermined synchronization parameter thresholds are satisfied;

reassigns the leader distributed generator as a follower distributed generator and re-enabling its bi-way communications with each of its neighboring distributed generators after connecting the first adjacent power grid with the microgrid; and iterate synchronizing of each remaining identified adjacent power grid with the above steps, based on a received request to connect to the microgrid from an identified adjacent power grid.

* * * * *